US006987540B2

(12) United States Patent
Narushima et al.

(10) Patent No.: US 6,987,540 B2
(45) Date of Patent: Jan. 17, 2006

(54) DIGITAL BROADCASTING RECEPTION SYSTEM, DIGITAL BROADCASTING RECEIVER, DISPLAY, PRINTER AND PRINTING METHOD

(75) Inventors: Toshio Narushima, Kanagawa (JP); Yoshio Kitamura, Kanagawa (JP); Yuji Kawamura, Kanagawa (JP); Makoto Niioka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/073,141

(22) Filed: Mar. 4, 2005

(65) Prior Publication Data

US 2005/0243207 A1 Nov. 3, 2005

Related U.S. Application Data

(63) Continuation of application No. 09/706,116, filed on Nov. 3, 2000, now Pat. No. 6,870,571.

(30) Foreign Application Priority Data

Nov. 4, 1999 (JP) ................................ 11-314289

(51) Int. Cl.
*H04N 1/032* (2006.01)

(52) U.S. Cl. ................... 348/552; 348/553; 348/207.2; 358/1.1; 358/1.15; 725/80; 725/153

(58) Field of Classification Search ................ 348/552, 348/553, 207.2; 358/1.15, 1.16, 1.1, 1.17, 358/296; 725/74, 80, 133, 141, 153; 709/249; 710/100; 370/466, 467
See application file for complete search history.

(56) References Cited

U.S. PATENT DOCUMENTS

| | | | | |
|---|---|---|---|---|
| 4,626,926 | A | 12/1986 | Nakamura | |
| 4,635,132 | A | 1/1987 | Nakamura | |
| 5,028,993 | A * | 7/1991 | Kobori et al. | 358/540 |
| 5,045,951 | A * | 9/1991 | Kimura et al. | 358/445 |
| 5,070,404 | A * | 12/1991 | Bullock et al. | 348/460 |
| 5,109,281 | A * | 4/1992 | Kobori et al. | 358/296 |
| 5,111,285 | A | 5/1992 | Fujita et al. | |
| 5,579,116 | A * | 11/1996 | Sugiyama et al. | 358/296 |
| 5,636,315 | A | 6/1997 | Sugiyama et al. | |
| 6,298,405 | B1 | 10/2001 | Ito et al. | |
| 6,366,359 | B1 | 4/2002 | Garland | |
| 6,456,714 | B2 | 9/2002 | Shima et al. | |
| 6,457,079 | B1 | 9/2002 | Hanaoka et al. | |
| 6,480,630 | B1 | 11/2002 | Kondo | |
| 6,481,010 | B2 | 11/2002 | Nishikawa et al. | |
| 6,493,874 | B2 | 12/2002 | Humpleman | |
| 6,529,522 | B1 | 3/2003 | Ito et al. | |

* cited by examiner

*Primary Examiner*—Brian Yenke
*Assistant Examiner*—Jean W. Désir
(74) *Attorney, Agent, or Firm*—Frommer Lawrence & Haug LLP; William S. Frommer; Samuel S. Lee

(57) ABSTRACT

The video data contained in the digital broadcasting received by a receiver are transmitted to a printer at high speed and at low cost. A receiver (STB 30) for receiving digital broadcasting, a display 31 for displaying the images of the digital broadcasting received by the STB 30 and a printer 32 for printing images contained in the digital broadcasting received by the STB 30 are connected to each other by way of a first signal transmission means adapted to transmit digital signals. The printer 32 obtain video data from the receiver 30 by way of the first signal transmission means.

3 Claims, 20 Drawing Sheets

DIGITAL BROADCASTING RECEPTION SYSTEM, DIGITAL BROADCASTING RECEIVER, DISPLAY, PRINTER AND PRINTING METHOD

This is a continuation of Application No. 09/706,116, filed Nov. 3, 2000, now U.S. Pat. No. 6,870,571.

BACKGROUND OF THE INVENTION

1. Field of the Invention

This invention relates to a digital broadcasting reception system comprising a receiver for receiving signals transmitted by digital broadcasting, a display for displaying the images and/or the sounds of the signals transmitted by digital broadcasting and received by the receiver and a printer for printing any of the images of the received signals. The present invention also relates to a digital broadcasting receiver comprising a printing section for printing any of the images of the signals transmitted by digital broadcasting and received by the receiver. Furthermore, the present invention also relates to a receiver for receiving signals transmitted by digital broadcasting and a printer adapted to print any of the images of the signals transmitted by digital broadcasting and received by the receiver. Finally, this invention also relates to a printing method to be used for printing images of signals transmitted by digital broadcasting by means of a printer according to the invention.

2. Related Background Art

Conventionally, an analog video printer is used for printing out any of the images of the reception signals displayed on a display, which may typically be a CRT (Cathode Ray Tube) display.

FIG. 1 of the accompanying drawings is a schematic block diagram of a known analog video printer. Referring to FIG. 1, analog video signals output from display 500 are input to the printer. In the case of FIG. 1, the display 500 is adapted to receive television signals and video signals and display images produced out of the received signal. An analog video printer 501 is adapted to receive analog video signals representing images displayed on the display 500.

The analog video printer 501 performs an digitizing processing operation on the input analog video signal and stores it in frame memory 502 as video data to update the data already stored in the frame memory 502. Upon receiving an external command for printing one or more than one images, the analog video printer 501 suspends the operation of storing data and updating the data in the frame memory 502 and reads out the video data stored in the frame memory 502 in order to print the images by means of printer engine 503.

The analog video printer 501 is provided with a printing confirmation display section 504 which is typically a liquid crystal display for confirming the video data to be used for the printing and analogizes the stored and updated video data in frame memory 502 into an analog-video signal, which is then output to the printing confirmation display section 504. The printing confirmation display section 504 displays the image generated from the input analog video signal.

An analog video printer 501 having a configuration as described is norm ally used to print a specific image contained in a continuous moving picture data. Therefore, the external printing command is a two step command including a first step of confirming the image selected out of the moving picture data and a second step of initiating the operation of printing the confirmed image. While the analog video printer 501 may not be provided with a printing confirmation display section 504, then it is not possible to confirm in advance the image to be printed.

The above described analog video printer 501 is adapted to use generally available signals such as NTSC (National Television System Committee) signals, PAL (Phase Alternation by Line) signals, RGB video signals and S terminal video signals.

Analog multi-scan printers and PC printers normally are used for printing out images displayed on the displays of information processing apparatus such as personal computers (to be referred to as PCs hereinafter).

As shown in FIG. 2 of the accompanying drawings, an analog multi-scan printer 510 is typically adapted to receive an analog CRT interface signal output from the PC main frame 511 to the display 512. The analog multi-scan printer 510 duplicates the input analog CRT interface signal and outputs one of the signals to display 512, while performs a processing operation of digitizing the other signal. The digitized signal is then sent to the frame memory 513 as video data to be recorded there in order to update the data already stored there. Then, upon receiving an external printing command input to it, it suspends the operation of storing data and updating the data in the frame memo 513 and reads out the video data stored in the frame memory 513 in order to print the images by means of printer engine 514.

Alternatively, an analog multi-scan printer 510 may comprise a printing confirmation display section just like the above described analog video printer 501. The analog CRT interface signal may be an RGB video signal and a synchronizing signal to be used for the RGB video signal. The signal mode of analog CRT interface signals is usually defined by the following values:

| | |
|---|---|
| horizontal resolution: | 640–1600 dots, |
| vertical resolution: | 480–1200 lines, |
| horizontal deflection frequency: | 30–107 kHz and |
| vertical deflection frequency: | 48–160 Hz. |

An analog multi-scan printer 510 is adapted to operate for multi-scanning according to a signal of the above signal mode and obtain video data good for the size of the picture to be printed for the purpose of printing.

FIG. 3 of the accompanying drawings is a schematic broadcasting of a PC printer. Referring to FIG. 3, the PC printer 520 is adapted to receive printing data from PC main frame 521 apart from the video signal output from the PC main frame 521 to display 522 by way of general purpose printer interface.

With the PC printer 520, character data and video data are generated by an application program driven by the PC main frame 521 and delivered to the OS (Operating System) of the PC main frame 521 to display images on the display 522. Upon receiving a printing command, the OS causes the printer driver contained in the PC main frame 521 to start operating and then the printer driver converts the character data and the video data into printing data in a format adapted to the PC printer 520 connected to the PC main frame 521 and transmits the printing data to the PC printer 520. Then, the PC printer 520 translates the printing data it receives and operates to print out appropriate images as it is driven to operate by printer engine 523.

The general purpose printer interface of the PC printer 520 may typically be a Bi-Centronics (IEEE-1284), an RS-232C, an SCSI, an Ir-DA or a USB.

When receiving news and programs of television broadcasting, conventionally, analog television signals are received by means of a receiver. The received analog television signal is then processed by an analog electronic circuit to obtain the image represented by the signal, which image is then displayed on a display. However, television broadcasting is expected to replace analog signals with digital signals in near future.

More specifically, in Japan, CS digital broadcasting started in October '96 and it is expected that the current CATV, BS broadcasting and ground wave broadcasting are digitized very soon. Digital television broadcasting can provide higher quality images than analog television broadcasting. Furthermore, digital television broadcasting can additionally provide various information services referred to as SI (Service Information) in addition to the transmission of ordinary television signals. Services such as EPGs (Electronic Program Guides) can be provided by means of SI signals and displayed on displays.

Thus, with digital television broadcasting, it is possible to display not only news and programs but also various program guides simultaneously or selectively. Then, the television display set is required to display high definition images in terms of not only pictures but also characters. Additionally, the receiver set is required to process various digital signals it receives and send the processed digital signals to the display set.

Meanwhile, in recent years, various organizations have been studying about digital interface standards to be established for displays that are adapted to be connected to the video ports of various electronic devices such as personal computers and set top boxes (to be referred to as STB hereinafter). For instance, the Japan Electronic Industry Development Association (JEIDA) has already established the Digital Interface Standards for Monitor, Version 1.0 in January '99.

Under these circumstances, conventional analog video printers 501, analog multi-scan printers 510 and PC printers 520 as described above give rise to a number of problems particularly in terms of printing quality, printing rate and the cost of printer when they are used for printing pictures and service information provided by digital television broadcasting.

More specifically, the analog video printer has to use analog video signals 501 such as NTSC signals. The number of dots that an analog video signal can provides for an image is 600 dots×450 dots at most. Additionally, analog video signals faces a limit in terms of high definition when providing color information for moving images, although this may not be any problem for viewers seeing them on the television screen because of the perceptual characteristics of the visual sense of man. Still additionally, analog video signals are limited in terms of the length of the signal line that can be used for sending them from the display to the printer. In other words, it is difficult to arrange the display and the printer remotely relative to each other.

On the other hand, the analog multi-scan printer can obtain video information up to 1600 dots×1200 dots per image depending on the signal mode to be used. However, on characteristics of the analog CRT interface signal, the analog video printer 501 also faces a limit in terms of the length of the signal line that can be used for sending video signals from the display to the printer. Additionally, the analog multi-scan printer 510 requires circuits for A/D conversion and D/A conversion along with measures for preventing noises and degradation of signals, which make the printer very complex and costly.

The PC printer 520 can transmit video data almost without limitations in terms of resolution and quality of printed images because the general purpose printer interface can cope with high speed operations. However, most of the operation of processing images necessary for the printer engine 523 of the PC printer 520 for printing has to be carried out by the PC main frame 521. Then, the RAM and the hard disk memory of the PC main frame 521 are required to have a large memory capacity in order to make themselves adapted to high resolution and high quality printing. Additionally, the PC main frame 521 has to be provided with a CPU that can operates at high speed in order to process video data at a rate corresponding to the resolution and the quality of the images to be printed Still additionally, the PC main frame 521 has to be provided with an operational environment good for such high speed operations.

Finally, when transmitting video data by connecting a television receiving set for receiving television broadcasting and a printer and using a general purpose printer interface such as the one used for the above described PC printer 520, the television receiving set has to be provided with a high speed arithmetic processing capacity, a large capacity memory means and a high speed output port for the general purpose interface to push up the cost of the television receiving set, although the high speed arithmetic processing capacity, the large capacity memory means and the high speed output port for the general purpose interface remain useless unless a printer is connected to the television receiving set.

BRIEF SUMMARY OF THE INVENTION

In view of the above described problems, it is therefore the object of the present invention to provide a digital broadcasting reception system, a digital broadcasting receiver, a receiver, a printer and a printing method that does not require any high speed transmission of video data when printing images contained in the digital broadcasting nor costly circuits and features that are useless except for printing.

According to the invention, the above problem is dissolved by providing a digital broadcasting reception system comprising a receiver for receiving digital broadcasting, a display for displaying the images of the digital broadcasting received by said receiver and a printer for printing images contained in the digital broadcasting received by said receiver;

said receiver, said display and said printer being connected to each other by way of a first signal transmission means for transmitting digital signals;

said receiver having:

a reception means for receiving digital broadcasting;

an imaging means for generating video data by performing a predetermined imaging operation according to the received signals of digital broadcasting; and an output means for transmitting the video data generated by said imaging means by way of said first signal transmission means;

said printer having:

a reception means for receiving video data transmitted by said first signal transmission means; and a printing means for printing the images of the video data received by said reception means.

With a digital broadcasting reception system according to the invention and having the above described configuration, the video data to be used for printing can be transmitted at high speed because the first signal transmission means that is provided to transmit video data from the receiver to the display is used when the printer receives the video data from the receiver. Additionally, it is no longer necessary for the system to comprise a D/A converter circuit nor an A/D converter circuit because the video data contained in the digital broadcasting are transmitted by the first signal transmission means for transmitting digital signals so that noises and any degradation of signals can be prevented from taking place and the operation of printing high quality images can be conducted at low cost.

In another aspect of the present invention, there is also provided a a digital broadcasting receiver comprising a receiving section for receiving digital broadcasting and a printing section connected to said receiving section by way of a first signal transmission means for transmitting signals in order to print images contained in the digital broadcasting received by said receiving section;

said receiving section having:

a reception means for receiving digital broadcasting;

an imaging means for generating video data by performing a predetermined imaging operation according to the received signals of digital broadcasting; and an output means for transmitting the video data generated by said imaging means by way of said first signal transmission means;

said printing section having:

a reception means for receiving video data transmitted by said first signal transmission means; and a printing means for printing the images of the video data received by said reception means.

With a digital broadcasting receiver according to the invention and having the above described configuration, the video data to be used for printing can be transmitted at high speed because the first signal transmission means that is provided to transmit video data from the receiving section to an external display is used when the printing section receives the video data from the receiving section. Additionally, it is no longer necessary for the system to comprise a D/A converter circuit nor an A/D converter circuit because the video data contained in the digital broadcasting are transmitted by the first signal transmission means for transmitting digital signals so that noises and any degradation of signals can be prevented from taking place and the operation of printing high quality images can be conducted at low cost.

In still another aspect of the present invention, there is provided a receiver comprising:

a reception means for receiving digital broadcasting;

an imaging means for generating video data by performing a predetermined imaging operation according to the received signals of digital broadcasting; and an output means for transmitting the video data generated by said imaging means to a display for displaying digital broadcasting and a printer for printing images contained in digital broadcasting by way of a first signal transmission means.

With a receiver according to the invention and having the above described configuration, the video data to be used for printing can be transmitted at high speed because the first signal transmission means that is provided to transmit video data to the display is used when the printer receives the video data. Additionally, it is no longer necessary for the system to comprise a D/A converter circuit nor an A/D converter circuit because the video data contained in the digital broadcasting are transmitted by the first signal transmission means for transmitting digital signals so that noises and any degradation of signals can be prevented from taking place and the operation of printing high quality images can be conducted at low cost.

In still another aspect of the invention, there is provided a printer for printing the images of the video data generated by a receiver out of the digital broadcasting received by it, said printer comprising:

a reception means for receiving the video data transmitted from said receiver to a display for displaying digital broadcasting and to the printer by way of a first signal transmission means for transmitting signals; and a printing means for printing the images of the video data received by said reception means.

With a printer according to the invention and having the above described configuration, the video data to be used for printing can be transmitted at high speed because the first signal transmission means that is provided to transmit video data from the receiver to the display is used when the printer receives the video data. Additionally, it is no longer necessary for the system to comprise a D/A converter circuit nor an A/D converter circuit because the video data contained in the digital broadcasting are transmitted by the first signal transmission means for transmitting digital signals so that noises and any degradation of signals can be prevented from taking place and the operation of printing high quality images can be conducted at low cost.

In a further aspect of the present invention, there is also provided a printing method for receiving digital broadcasting by means of a receiver and printing images contained in the digital broadcasting received by said receiver, said method comprising:

connecting said receiver, a display for displaying the images of the digital broadcasting received by said receiver and said printer to each other by means of a first signal transmission means for transmitting digital signals;

said receiver operating for:

receiving digital broadcasting;

generating video data by performing a predetermined imaging operation according to the received signals of digital broadcasting; and transmitting the video data generated by said imaging means by way of said first signal transmission means;

said printer operating for:

receiving the video data transmitted by said first signal transmission means; and printing the images of the video data received by said reception means.

With a printing method according to the invention and adapted to operate with the above described steps, the video data to be used for printing can be transmitted at high speed because the first signal transmission means that is provided to transmit video data from the receiver to the display is used when the printer receives the video data from the receiver. Additionally, it is no longer necessary for the system to comprise a D/A converter circuit nor an A/D converter circuit because the video data contained in the digital broadcasting are transmitted by the first signal transmission means for transmitting digital signals so that noises and any degradation of signals can be prevented from taking place and the operation of printing high quality images can be conducted at low cost.

DETAILED DESCRIPTION OF THE INVENTION

Now, the present invention will be described in greater detail by referring to the accompanying drawings that illustrate preferred embodiments of the invention. While a digital broadcasting reception system according to the invention comprises a receiving section for receiving digital broadcasting, a display section for display images of digital broadcasting and a printing section for printing images contained in digital broadcasting, each these sections can be configured in various different ways. Thus, the embodiments as described below differ from each other in terms of the configuration of any of these sections.

In the following description, the expression of "digital broadcasting" refers broadcasting transmitted from a broadcasting station in the form of digital signals. As far as this patent application is concerned, digital broadcasting is not limited to a specific mode of transmission and includes conventional ground wave broadcasting, satellite broadcasting for transmitting signals by way of an artificial satellite such as BS broadcasting and CS broadcasting and wired broadcasting for transmitting signals by way of cables and/or wires such as CATV.

Figure 4:
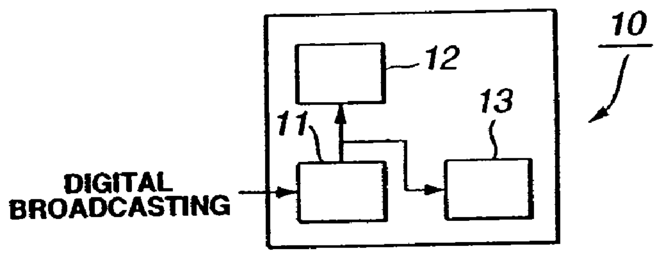
FIG. 4 is a schematic block diagram of a digital television receiver according to the invention.

The present invention can be applied to a digital television receiving set 10 as shown in FIG. 4. The digital television receiving set 10 comprises a receiving section 11 for receiving digital broadcasting, a display section 12 for displaying digital broadcasting and a printing section 13 for printing images contained in digital broadcasting.

Figure 5:
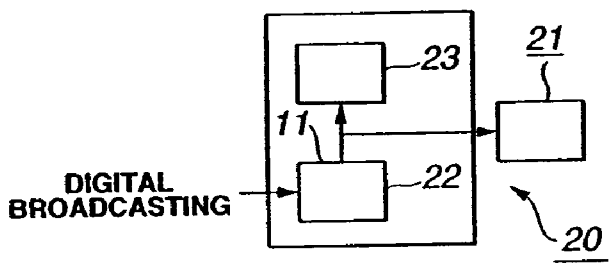
FIG. 5 is a schematic block diagram of a digital television receiver and a printer according to the invention.

The present invention can also be applied to a digital television receiving set 20 and a printer 21 connected to the digital television receiving set 20 as shown in FIG. 5. The digital television receiving set 20 comprises a receiving section 22 for receiving digital broadcasting and a display section 23 for displaying digital broadcasting as integral parts thereof. In other words, the digital television receiving set 20 of FIG. 5 can be obtained by separating the printing section 13 of the digital television receiving set 10 of FIG. 4 and arranging it externally.

Figure 6:
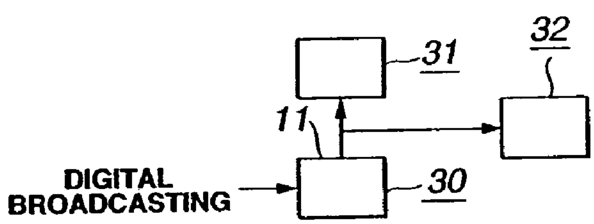
FIG. 6 is a schematic block diagram of an STB, a display and a printer according to the invention.

The present invention can also be applied to a set top box (to be referred to as STB hereinafter) 30 and a display 31 and a printer 32 connected to the STB 30 as shown in FIG. 6. The STB 30 has the function of receiving digital broadcasting. In other words, the STB 30, the display 31 and the printer 32 of FIG. 6 can be obtained by separating the receiving section 11, the display section 12 and the printing section 13 of the digital television receiving set 10 of FIG. 4 and arranging them independently.

Figure 7:
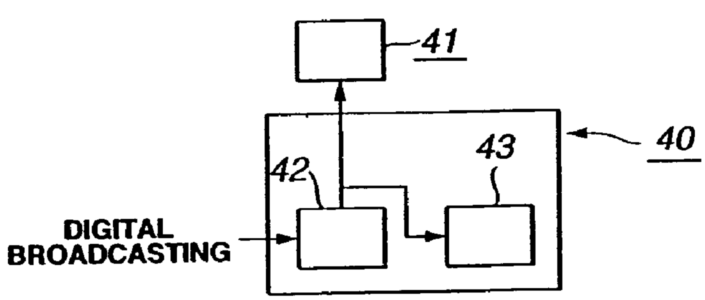
FIG. 7 is a schematic block diagram of an STB and a display according to the invention.

The present invention can also be applied to a set top box (STB) 40 and a display 41 connected to the STB 40 as shown in FIG. 7. The STB 40 comprises a receiving section 42 for receiving digital broadcasting and a printing section 43 for printing images contained in digital broadcasting. In other words, the STB 40 of FIG. 7 can be obtained by combining the STB 30 and the printer 32 of FIG. 6 into an integral unit.

As pointed out above, the present invention can be applied to an arrangement obtained by combining a receiving section for receiving digital broadcasting, a display section for display digital broadcasting and a printing section for printing images contained in digital broadcasting, which may be configured in many different ways. According to the present invention, a first signal transmission means for transmitting digital signals of video data contained in the digital broadcasting received by the receiving section from it to the display section is also utilized when transmitting video data contained in the digital broadcasting to the printing section.

In other words, the present invention is characterized by utilizing a first signal transmission means adapted to transmit digital signals of video data at relatively high speed from the receiving section to the display section also for the printing section to obtain video data from the receiving section. As a result, according to the invention, it is possible to transmit video data to be used by the printing section for printing at high speed from the receiving section. Additionally, since the video data contained in the received digital broadcasting are transmitted by way of the first signal transmission means adapted to transmit digital signals, it is no longer necessary to arrange a D/A converter circuit and an A/D converter circuit in order to transmit video data from the receiving section to the printing section so that noises and any degradation of signals can be prevented from taking place and the operation of printing high quality images can be conducted at low cost.

For the purpose of the present invention, the first signal transmission means may be wired type signal transmission means typically comprising wires and/or optical fibers or wireless type signal transmission means adapted to transmit signals by way of radio waves and/or infrared rays.

As described above, according to the invention, a receiving section, a display section and a printing section can be combined in various different ways. Therefore, the present invention will be firstly described in detail by referring to FIG. 6 illustrating a first embodiment of the invention where an STB 30, a display 31 and a printer 32 are arranged separately.

Embodiment 1

Figure 8:
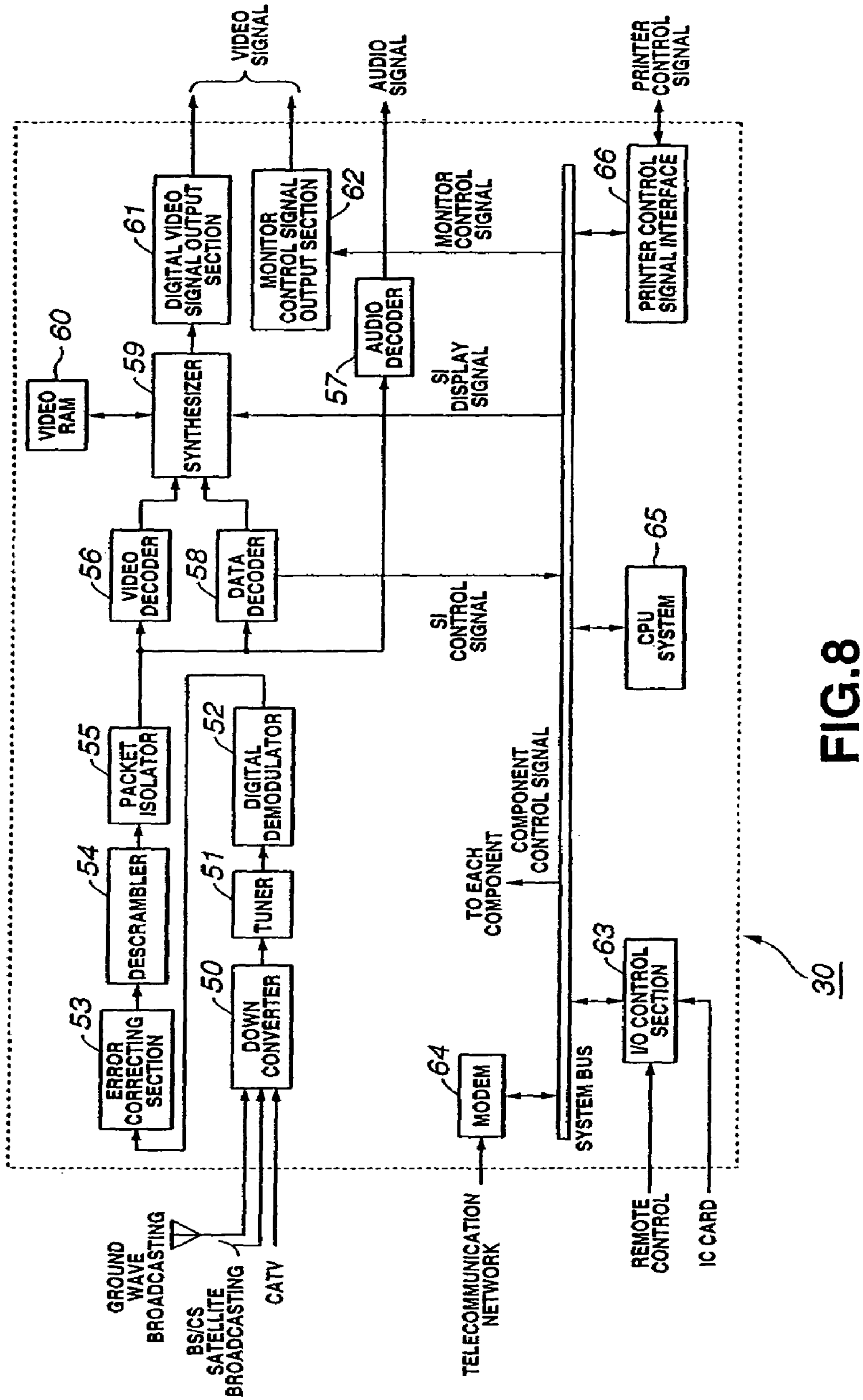
FIG. 8 is a schematic block diagram of an STB according to the invention.

Referring to FIG. 8, an STB 30 typically comprises a down converter 50, a tuner 51, a digital demodulator 52, an error correcting section 53, a descrambling section 54, a packet isolator 55, a video decoder 56, an audio decoder 57, a data decoder 58, a synthesizer 59, a video RAM 60, a digital video signal output section 61 and a monitor control signal output section 62. The STB 30 additionally comprises an I/O control section 63, a modem 64, a CPU system 65 and a printer control signal interface 66. Note that, in FIG. 8, the arrows indicate the flows of different signals that are exchanged among the components of the STB 30.

While the STB 30 may be so configured as to be adapted to receive digital broadcasting in various different modes including ground wave broadcasting, satellite broadcasting and wired broadcasting, it will be described below in terms of a so-called IRD (Integrated Receiver Decoder) that is adapted to receive currently available CS digital broadcasting. In the case of CS digital broadcasting, digital signals including those of moving image information, still image information and SI (Service Information) are provided by broadcasting stations and so-called service providers and contents providers. SI refers to signals representing tables describing various service information arranged in a predetermined transmission format. The transmission service station transmits digital signals by way of ground wave broadcasting, satellite broadcasting or wired broadcasting. If, necessary, digital signals may be scrambled so that receivers who have not concluded an agreement with the transmission service station cannot properly receive digital broadcasting.

The down converter 50 is connected to a reception antenna, which is, for example, assigned to the 12 GHz band and converts the received radio wave into a wave with an intermediate frequency approximately between 950 MHz and 2 GHz. Note that, however, the down converter 50 of the STB 30 is not limited to such that is connected to an antenna of the above described type but may alternatively be connected to an antenna for receiving ground wave broadcasting, one for receiving satellite broadcasting or a signal line for wired broadcasting.

The tuner 51 tunes in specific signals of the digital broadcasting coming from the down converter 50 to show an intermediate frequency. In other words, it select the signals of a specific channel out of the digital broadcasting signals coming from the down converter 50. As will be described hereinafter, it may be so arranged that the tuner 51 can select a specific channel according to the command issued by the user by way of a remote control unit.

The digital demodulator 52 performs a demodulating operation of QPSK (Quadrature Phase Shift Keying) on the digital broadcasting signals selected by the tuner 51. For example, the digital demodulator 52 may be adapted to have a band width of 27 MHz and transmit its output bit stream at a rate of 42.192 Mbit/s.

The error correcting section 53 performs an operation of Viterbi decoding, synchronous detection, Reed-Solomon decoding (204, 188) and deinterleaving on the digital broadcasting signals QPSK-demodulated by the digital demodulator 52 and extract, for example, a 29.162 Mbit/s transport stream (TS). The error correcting section 53 may typically show a convolution rate between ½ to ⅞ when carrying out the operation of Viterbi decoding.

The descrambling section 54 performs a processing operation of descrambling the packet having a specific PID (Packet ID) in the transport stream extracted by the error correcting section 53. For instance, MULTI2 for classifying signals by means of block codes may be used for the scrambling algorithm. It may alternatively be so arranged that the STB 30 externally takes out the descrambled signals by outputting them from an output terminal at high speed.

The packet isolator 55 operates to take out only the packet of a desired program from the signals descrambled by the descrambling section 54. The signals produced by the descramblinging section 54 are those containing video information and audio information that are multiplexed typically according to the MPEG2 Standards. Thus, the packet isolator 55 takes out only the packet of a desired program from the multiplexed signals while it obtains the SI information and regenerates the clock at the same time. Then, the packet isolator 55 outputs the packet it takes out to the video decoder 56, the audio decoder 57 and the data decoder 58.

Thus, the STB 30 has the down converter 50, the tuner 51, the digital demodulator 52, the error correcting section 53, the descrambling section 54 and the packet isolator 55 collectively as reception means for receiving digital broadcasting. It may be needless to say, however, that the configuration of the reception means of the STB 30 is not limited to the above described one and the reception means of the STB 30 may have any other configuration so long as it is adapted to properly receive digital broadcasting.

The video decoder 56 and the audio decoder 57 decodes respectively the video data and the audio data that are coded typically according to the MPEG2 Standards and taken out from the packet sent from the packet isolator 55. Then, the video decoder 56 outputs the decoded video data to the synthesizer 59, while the audio decoder 57 externally outputs the decoded audio data as audio signal.

The data decoder 58, on the other hand decodes the SI information obtained by the packet isolator 55 that may include EPG (Electronic Program Guide) information and detailed program information as well as other pieces of information. After the decoding, it outputs the part of the SI information that can be directly developed into displayable data to the synthesizer 59 and the remaining part of the SI information that cannot be directly developed into displayable data to the CPU system 65 by ways the system bus as SI control signal. The SI control signal output to the CPU system 65 is processed by the latter before it is output the synthesizer 59 as SI display signal. At this time, the CPU system 65 converts the data of the SI information that cannot be directly developed into displayable data into a displayable SI display signal typically by way of a converting operation utilizing font data stored in a font ROM.

The synthesizer 59 synthetically combines the video data decoded by the video decoder 56, the SI information decoded by the data decoder 58 and the SI display signal input from the CPU system 65 and prepare a display data of a frame to be displayed on the display 31.

Thus, according to the invention, the STB 30 has the video decoder 56, the audio decoder 57, the data decoder 58, the synthesizer 59 and the video RAM 60 collectively as imaging means. It may be needless to say, however, that the configuration of the imaging means of the STB 30 is not limited to the above described one and the imaging means of the STB 30 may have any other configuration so long as it is adapted to properly generate video data by carrying out a predetermined imaging processing operation according to the received digital signal.

The digital video signal output section 61 outputs the display data prepared by the synthesizer 59 to the outside as digital signal.

The monitor control signal output section 62 externally outputs the monitor control signal sent from the CPU system 65 by way of the system bus as digital signal.

Thus, the STB 30 has the digital video signal output section 61 and the monitor control signal output section 62 collectively as digital video interface for transmitting digital signals to the external display 31 that is connected to it. While the digital video signal output section 61 and the monitor control signal output section 62 are shown separately in FIG. 8, it may alternatively be put together to form an integral component of the STB 30 so long as they operate properly as digital video interface.

While digital signals output from the STB 30 are not limited to the signal format adapted to the digital video signal output section 61 and the monitor control signal output section 62, they preferably conform to given signal format standards because the STB 30 can be connected to a display 31 and/or a printer 32 conforming to the same standards without problem.

An example of signal format standards is the Digital Interface Standards for Monitor Version 1.0 established by the Japan Electronic Industry Development Association (JEIDA) in January, 1999. The above standards support the following signal formats.

1) digital data
   TMDS (Transition Minimized Differential Signalling)
   LVDS (Low Voltage Differential Signalling)
   GVIF (Giga-bit Video Interface)
   Conforming to any of the above is indispensable.
2) isolated horizontal and vertical synchronizing signals indispensable
3) data enable signal indispensable
4) DDC (Digital Data Channel) indispensable
5) signal for VESA hot plug (SENS) indispensable
6) USB (Universal Serial Bus) optional Then, four standards are defined as shown in Table I below by combining the above signal formats.

TABLE 1

| | data format | support signal | interface terminal | |
|---|---|---|---|---|
| | | | receiver side | display side |
| standard 1 | TMDS | digital data, DDC, USB | MDR connector 26, 20 pins & compatible ones | MDR connector 26 pins & compatible ones |
| standard 2a | LVDS | digital data, DDC, USB | MDR connector 26 pins & compatible ones | MDR connector 26 pins & compatible ones |
| standard 2b | LDI | digital data, DDC, USB | MDR connector 36 pins & compatible ones | MDR connector 36 pins & compatible ones |
| standard 3 | GVIF | digital data, DDC, USB | MDR connector 14 pins & compatible ones | MDR connector 14 pins & compatible ones |

*LDI stands for LVDS Display Interface.

Of the four standards shown in Table 1 above, Standard 2b and Standard 3 are those for transmitting both video signals and control signals by way of a same signal line. If the STB 30 is made to conform to Standard 2b and Standard 3, it is desirable to put the digital video signal output section 61 and the monitor control signal output section 62 together into a single and integral component in a manner as described above so as to transmit both video signals and control signals by way of a same signal line.

As pointed out above, the STB 30 has the digital video signal output section 61 and the monitor control signal output section 62 as output means for sending the video data generated by the imaging means to the display 31 and the printer 32. However, the configuration of the output means of the STB 30 is not limited to the above described one and may be modified appropriately so long as the output means is adapted to transmit the video data generated by the imaging means by way of the first signal transmission means.

Of the STB 30, the I/O control section 63 is connected to the system bus arranged within the STB 30 and typically adapted to receive various commands issued by the user by way of a remote control unit to operate the STB 30. The I/O control section 63 may be so arranged as to record data on and reproduce data from an IC card. More specifically, for instance, when receiving scrambled digital broadcasting, such an IC card may be used to store information on the subscription status of the user for receiving digital broadcasting from pay TV stations including data on the payment of subscription fees so that the STB 30 may descramble only the digital broadcasting signals for which the user is eligible and control the remaining reception time of the user. Additionally, the I/O control section 63 may be so arranged as to retrieve subscription-related information from digital broadcasting stations and decode E-mails it receives by way of the modem 64.

The modem 64 is adapted to transmit and receive various information by way of telecommunication networks such as telephone lines and internet and connected to the system bus arranged within the STB 30. While the STB 30 does not necessarily comprise a modem 64, it can carry out the following processing operations when it is provided with a modem 64.

For example, the modem 64 may be used to transmit subscription-related information to and receive such information from (up link/down link) the subscriber management centers of digital broadcasting stations by way of telecommunication networks in connection with the operation of recording and reproducing such information by means of an IC card. If, on the other hand, the SI information output from the data decoder 58 contains a command for obtaining certain information by accessing a given address by way of a telecommunication network, the modem 64 may be used to obtain such information. If necessary, the obtained information may then be processed for development by means of the CPU system 65 to generate SI display signal.

The CPU system 65 typically comprises a CPU (Central Processing Unit), a program ROM (Read Only Memory), a font ROM, a RAM (Random Access Memory) and a flash memory. The CPU system 65 is connected to the system bus arranged within the STB 30 and adapted to control the various components of the STB 30 by transmitting and receiving control signals by way of the system bus. More specifically, the CPU system 65 controls the various components of the STB 30 according to the operating commands input to the I/O control section 63 by the user. Note that, in FIG. 8, the arrows showing the flows of various control signals being exchanged between the system bus and the components of the STB 30 are partly omitted.

As pointed out above, the CPU system 65 converts the data of the SI information that cannot be directly developed into displayable data into a displayable SI display signal typically by way of a converting operation utilizing font data stored in a font ROM according to the SI control signal output from the data decoder 58. As a result, it is possible to realize an OSD (On Screen Display) of character information according to the SI information fed to it.

The printer control signal interface 66 is connected to the system bus arranged within the STB 30 and operates to exchange printer control information with the printer 32. A printer control signal is a signal to be sent from the STB 30 to the externally connected printer 32 to order the start and/or the suspension of a printing operation or specify the size and the contents of each image to be printed by the printer. A printer control signal is also used by the printer 32 to provide the STB 30 with information on the completion of a printing operation, an out-of-printing paper status, a jammed sheet status or an out-of-ink status.

For example, upon receiving a printing start command input to the I/O control section 63 by the user and transmitted to it by way of the system bus, the printer control signal interface 66 transmits a printer control signal for starting a printing operation to the printer 32. Then, when the printer 32 properly completes the printing operation, it receives the information transmitted from the printer 32 on the completion of the printing operation to recognize that the printing operation is properly completed.

If, on the other hand, the printer 32 can not properly carry out the printing operation due to an out-of-printing paper status or a jammed sheet status, the printer control signal interface 66 receives the information telling about the uncompleted printing operation to recognize that the printer operation is not completed properly. It may be so arranged that the STB 30 generates an SI control signal indicating the uncompleted printing operation by means of the CPU system 65 and transmits a predetermined corresponding video signal to the display by way of the synthesizer 59 and the digital video signal output section 61 so that an image indicating the uncompleted printing operation is displayed on the display 31.

Meanwhile, in this embodiment, the STB 30 and the printer 32 are connected to each other not only by the above described first signal transmission means but also by a second signal transmission means showing a transmission rate lower than the first signal transmission means. Then, the printer control signal interface 66 of the STB 30 is adapted to exchange printer control signals with the printer 32 by way of the second signal transmission means. However, the present invention is by no means limited to the above configuration and it may be so arranged that the printer control signal may be inserted into the gaps of the video signal transmitted from the STB 30. With this arrangement, then the STB 30 and the printer 32 exchange control signals by way of the first signal transmission means.

It should be noted that a printer control signal contains by far less information than the video data to be transmitted by way of the first signal transmission means at a time so that it is not necessary for the STB 30 and the printer 32 to exchange printer control signals by way of the first signal transmission means that is adapted to transmit data at a high rate. Therefore, the first signal transmission means may be dedicated to the transmission of video data by using the separate second signal transmission means for the exchange of printer control signals between the STB 30 and the printer 32. Then, the first signal transmission means is prevented from reducing its signal transmission rate due to printing control signals that may otherwise sneaks in there.

As will be described hereinafter by referring to other embodiments of the present invention, it may be so arranged that the second signal transmission means is used not only for transmitting printing control signals but also various other signals that contain by far less information than the video data to be transmitted by way of the first signal transmission means.

For the purpose of the present invention, the second signal transmission means may be a wired type signal transmission means connecting wires or optical fibers or a wireless type signal transmission means of transmitting signals by way of radio waves and/or infrared rays. More specifically, it may be a signal transmission means conforming to appropriate known standards such as IEEE 802.3 (Ethernet), IEEE 1394 or USB.

Figure 9:
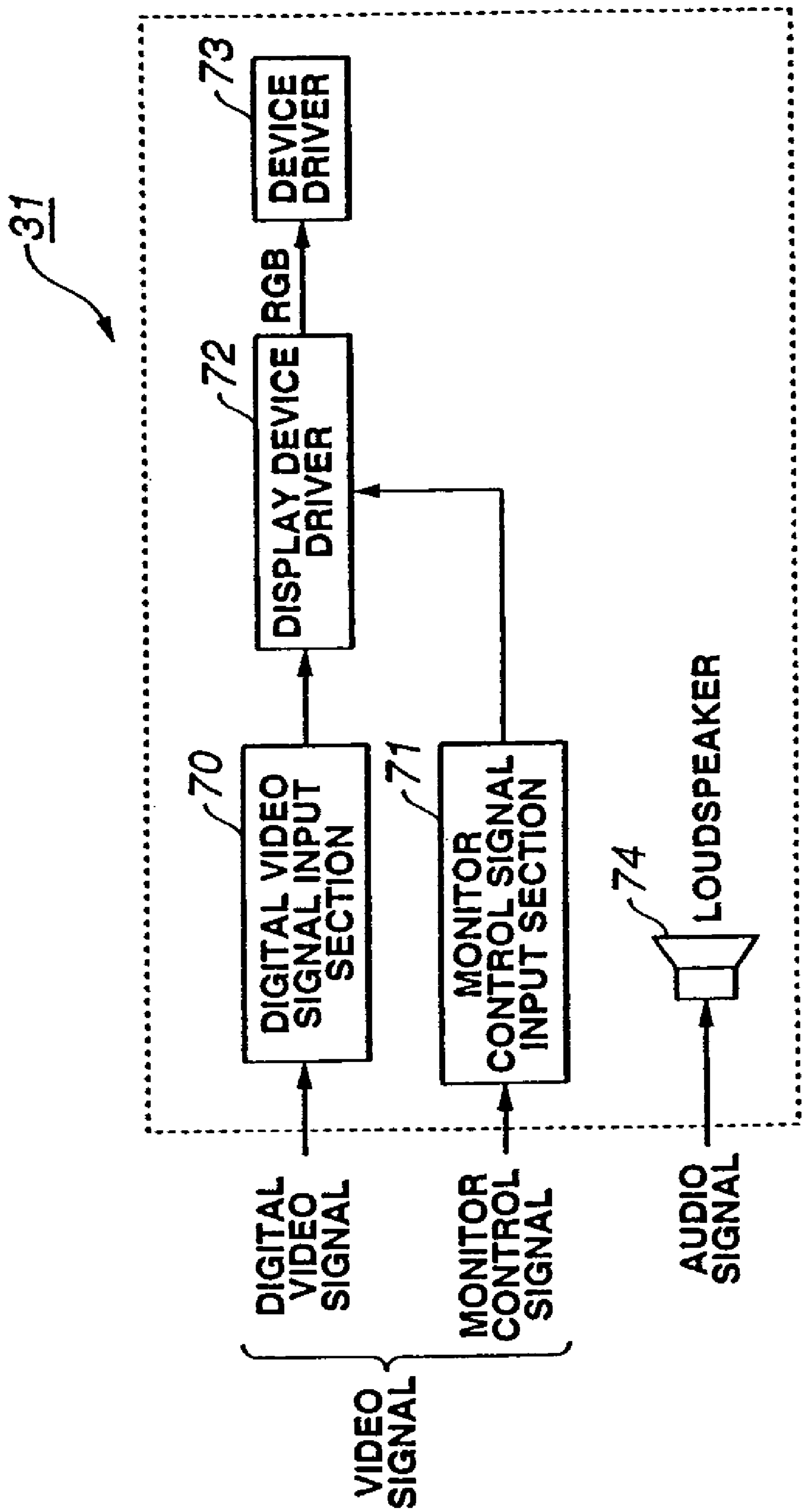
FIG. 9 is a schematic block diagram of a display according to the invention.

As shown in FIG. 9, the display 31 typically comprises a digital video signal input section 70, a monitor control signal input section 71, a display device drive section 72, a display device 73 and a loudspeaker 74. In FIG. 9, the arrows show the flows of various signals being exchanged among the various components of the display 31.

The digital video signal input section 70 and the monitor control signal input section 71 receives the respective video signals, which are a digital video signal and a monitor control signal, transmitted from the STB 30 and extract the video data to be displayed on the display 31 out of the video signals.

The display device drive section 72 receives the video data extracted by the digital video signal input section 70 and the monitor control signal input section 71 and generates a drive signal for driving the display device 73 on the basis of the video data. The drive signal typically comprises RGB signals.

The display device 73 operates to display a given image according to the drive signal generated by the display device drive section 72. For example, it may be a CRT (Cathode Ray Tube), an LCD (Liquid Crystal Display) or a plasma display.

The loudspeaker 74 receives the audio signal transmitted from the STB 30 and reproduce the original sound represented by the audio signal.

Now, an example of image that can be displayed on the display device 73 of the display 31 will be discussed below. As pointed out above, the present invention is adapted to receive not only digital broadcasting transmitted in the form of ground wave broadcasting, satellite broadcasting or wired broadcasting and aimed at ordinary homes but also conventional analog broadcasting and various other services provided in an internet environment by means of a comprehensive information terminal. For a comprehensive information terminal, it is important that it be used easily to accurately select a desired program for the purpose of viewing out of a large number of programs it receives and, at the same time, it is easy to operate it when selecting a particular service out of a number of services provided to it.

Figure 10:
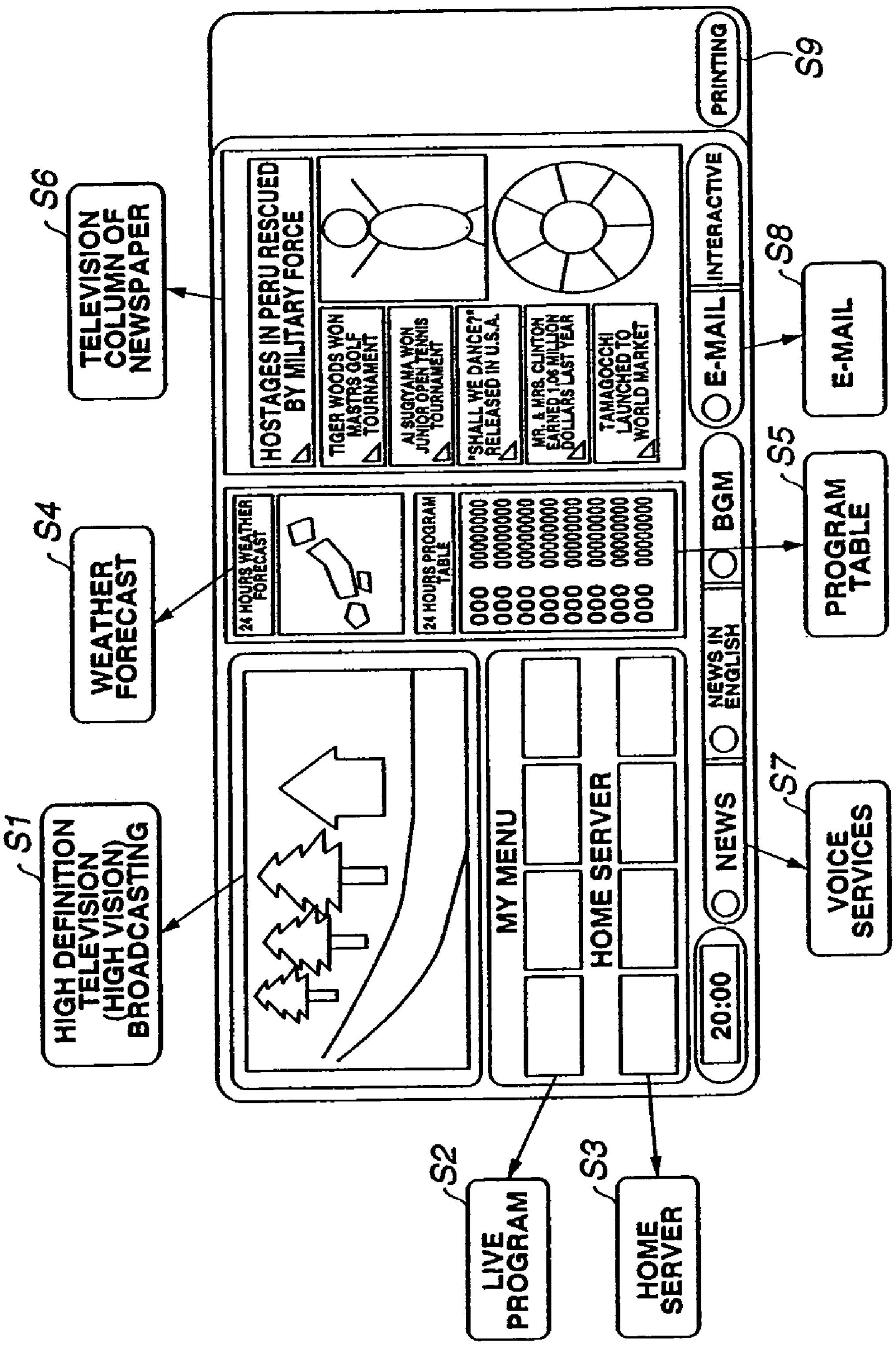
FIG. 10 is a schematic illustration of an initial image display on a display according to the invention.

FIG. 10 schematically illustrates a preferred image that is displayed on the display device 73 of the display 31 to allow an easy selecting operation to the viewer. Note that the image as shown in FIG. 10 is an example of initial image that is displayed on the display device 73 immediately after the display 31 is activated. Thus, as shown in FIG. 10, the initial image of the display 31 may comprise an area S1 for showing the high definition television program that is currently being received, an area S2 for showing a list of the programs that are currently being received, an area S3 for showing a list of the programs that are stored in the home server, an area S4 for showing information on the weather, an area S5 for showing a table of various broadcast programs and an area S6 for showing character information such as headlines of television newspapers.

The initial image of the display 31 may further comprise an area S7 to be used for selecting a sound service out of a number of sound services including news broadcasting services and music broadcasting services, an area S8 to be used for selecting and acting on an internet-related service such as E-mail and an area S9 to be used for issuing a command for a printing operation to the printer 32.

The component images of the above areas for synoptically showing the various services are synthetically combined by the synthesizer 59 of the STB 30 and displayed on the display device 73 of the display 31. Thus, the user can select a specific service from the displayed images by means of a remote control unit and the I/O control section 63. Upon receiving the command from the user, the STB 30 enlarges and displays the image of the selected service, which may be a television program, a music program or some other service.

It may alternatively be so arranged that an initial image as shown in FIG. 10 is displayed for a predetermined period of time after the activation of the display 31 and, if the user does not issue any command during the period, a preselected specific service, which may be a television program, a music program or some other service, is shown on the display device 73. The arrangement of the component images of the television programs, the music programs and other services may be customized to meet the request of the user.

A navigating operation using the initial image of FIG. 10 that is displayed on the display 31 will be described below. In FIG. 10, the arrows indicate how the image shown on the display 31 changes depending on the command issued by the user.

Figure 11:
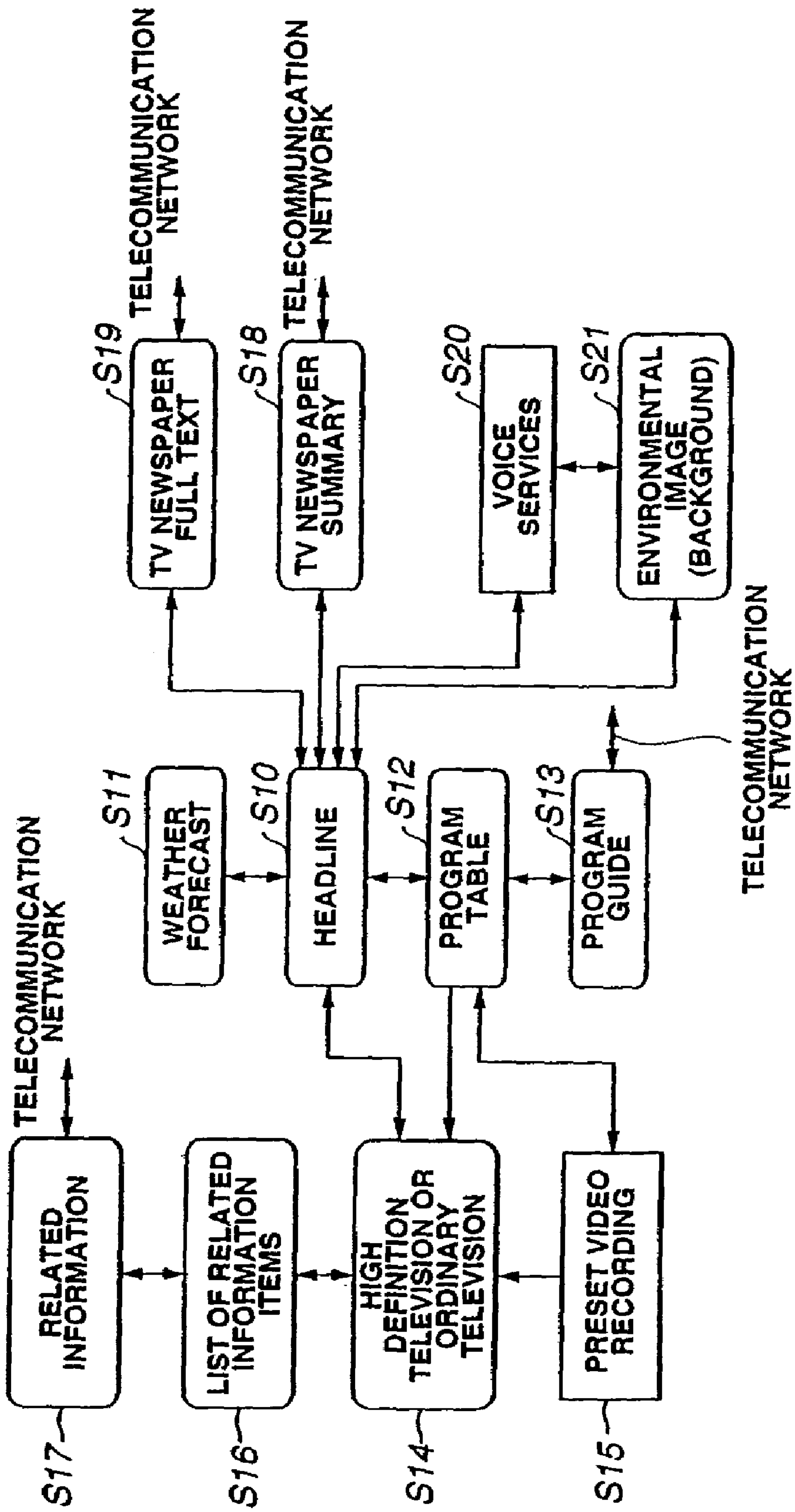
FIG. 11 is a schematic illustration of navigation that can be displayed on the screen of a display according to the invention.

Referring now to FIG. 11, the display 31 is in state S10 of showing the initial image. If the user issues a command for displaying the weather forecast, the display 31 moves from state S10 to state S11 where the weather forecast is displayed on the entire display device 73. The display 31 may move back from state S11 to state S10 of showing the initial image if a command is issued by the user for such a move.

If, on the other hand, the user issues a command for displaying the table of broadcast programs to the display 31 showing the initial image, the display 31 moves from state S10 to state S12 where the table of broadcast programs is enlarged and displayed on the entire display device 73.

The state S12, if the user issues a command for displaying detailed information on the programs shown on the table, the STB 30 accesses the sources of the programs typically by means of a modem 64 and a telecommunication network to obtain detailed information on the programs and moves to state SI 3 where the obtained information is displayed on the display device 73.

If, on the other hand, the user issues in state S10 of showing the initial image or in state S12 of showing the program table a command for selecting a specific broadcast program, in state S14 enlarges the selected broadcast program and displays it on the display device 73.

In state S12 where the table of broadcast programs is shown on the entire display device 73, the user may issue a command to make the STB 30 move to state S15 where the user can preset the STB 30 for recording a specific program: Additionally, it can be so arranged that the STB 30 moves from state S15 to state S14 at the preset time where the selected specific program is displayed on the entire display device 73.

Referring also to FIG. 11, if the user issues a certain command in state S14 where a specific program is displayed on the entire display device 73, the STB 30 moves to state S16 where a list of data relating to the broadcast program that is being displayed is displayed on the display device 73 so that the user may select any specific data item. Then, the STB 30 moves to state S17 where the selected data item is displayed on the display device 73. The STB 30 can obtain such information by accessing the source of the program typically by means of a modem 64 and a telecommunication network.

If, on the other hand, the user issues a certain command in state S10 of showing the initial image, the STB 30 may move to state S18 where the headlines of certain television newspapers are shown. If the user select a specific article in state S18, the STB 30 moves to state S19 where the full text of the selected article is displayed. Again, the STB 30 can obtain the full text of the selected article by accessing the news source typically by means of a modem 64 and a telecommunication network. Alternatively, the user may so operates the STB 30 that the latter moves from state S10 of showing the initial image to state S19 showing the full text of the selected article of the television newspaper.

Finally, if the user issues a certain command in state S10 of showing the initial image, the STB 30 may move to state S20 where a service in sound is output from the loudspeaker 74 or to sate S21 where a service of showing an environmental image on the display device 73. It may be so arranged that an environmental image is displayed on the display device 73 when a service in sound is output from the loudspeaker 74.

Figure 12:
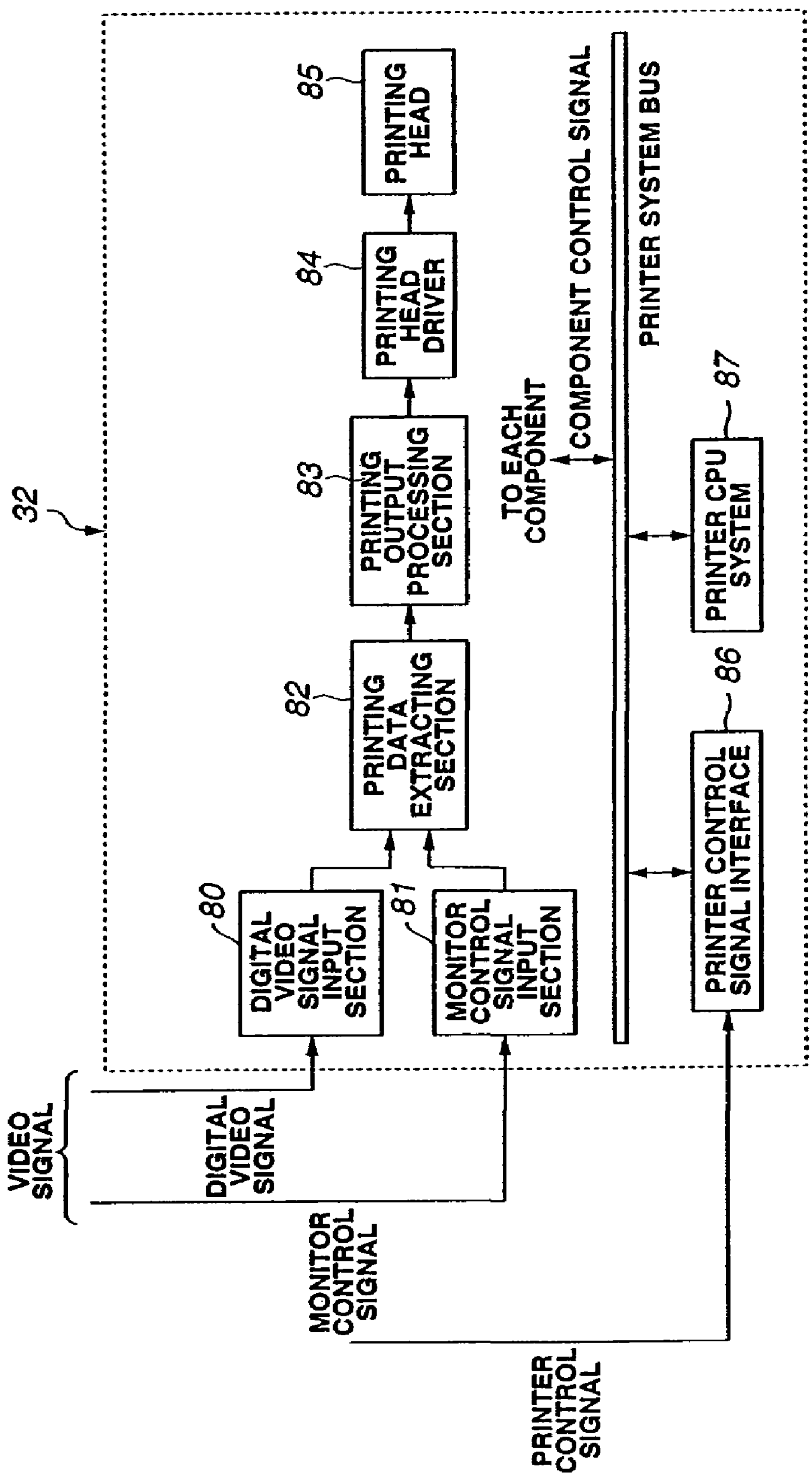
FIG. 12 is a schematic block diagram of a printer according to the invention.

Now, referring to FIG. 12, the printer 32 comprises a digital video signal input section 80, a monitor control signal input section 81, a printing data extracting section 82, a printing output processing section 83, a printing head driver 84, a printing head 85, a printer control signal interface 86 and a printer CPU system 87. In FIG. 12, the arrows show the flows of various signals being exchanged among the various components of the printer 32.

The digital video signal input section 80 and the monitor control signal input section 81 correspond respectively to the digital video signal input section 70 and the monitor control signal input section 71 of the display 31 and are adapted to receive the respective video signals, which are a digital video signal and a monitor control signal, transmitted from the STB 30 and extract video data out of the video signals.

The printing data extracting section 82 receives the video data extracted by the digital video signal input section 80 and the monitor control signal input section 81 and extracts only the video data to be used for the printing operation of the printer 32 out of the received video data.

While the printing data extracting section 82 of the printer 32 may extracts the video data same as those of the images to be displayed on the display 31, in the STB 30, it extracts only the video data to be used by the printer 32 by the printing data extracting section 82 for printing when video signals containing both the video data showing by the display 31 for displaying images and those to be used by the printer 32 for printing images.

Thus, the printer 32 has the digital video signal input section 80, the monitor control signal input section 81 and the printing data extracting section 82 as reception means for receiving video data transmitted from the STB 30. However, the configuration of the reception means of the printer 32 is not limited to the above described one and may be modified appropriately so long as the reception means is adapted to receive the video data received by way of the above described first signal transmission means.

The printing output processing section 83 generates printing data to be used for printing images by means of the printing head on the basis of the video data obtained by the printing data extracting section 82 as a result of a data converting operation.

More specifically, the printing output processing section 83 is adapted to perform conversion processing operations using an LUT (look-up table), arithmetic processing operations using an arithmetic circuit that can carry out multiplications and additions at high speed, arithmetic processing operations using software containing a high speed arithmetic processing algorism and/or processing operations using a dedicated conversion circuit. However, when the printing output processing section 83 is adapted to sequentially carry out arithmetic processing operations, using a number of bits same as those of each input video data, the effective degree of accuracy of the data can more often than not be degraded. Therefore, it is desirable that the printing output processing section 83 increases the number of bits from those of each input video data in the course of the arithmetic processing operations and reduce the increased number of bits back to the original level in the final stages of the arithmetic processing operations so that the possible degradation of the effective degree of accuracy can be avoided.

In the printer 32, the printing output processing section 83 operates as conversion processing means for processing the video data received by the above described reception means of the printer 32 in order to generate video data that are suited for printing images. While the conversion processing means is not indispensable for the purpose of the present invention, video data that are suited for printing images can be generated out of the video data that are suitable for displaying images and transmitted from the STB 30 to the display 31 so that high quality images may be printed if the printer 32 is provided with such a conversion processing means.

The printing head driver 84 generates drive signals for driving the printing head 85 on the basis of the printing data generated by the printing output processing section 83.

The printing head 85 is driven by the drive signals generated by the printing head driver 84 and operates to print predetermined images on sheets of printing paper. While not shown in FIG. 12, the printer 32 comprises a sheet feeding section for feeding sheets of printing paper in addition to the printing head 85. Since the sheet feeding section has a configuration same as its counterpart of any other ordinary printers, it will not be described here any further.

The printer 32 has the printing head driver 84 and the printing head 85 as printing means for printing images of the video data input to it. However, the configuration of the printing means of the printing means is not limited to the above described one and may be modified appropriately so long as the printing means is adapted to print images for the video data received by way of the above described reception means of the printer 32.

The printer control signal interface 86 is connected to the printer system bus arranged within the printer 32 and adapted to exchange printer control signals with the STB 30. More specifically, the printer control signal interface section 86 is equivalent to the above described printer control signal interface 66 of the STB 30 and operates to receive commands for starting and/or suspending printing operations sent from the STB 30 and transmitting information on the completion of a printing operation, an out-of-printing paper status in the printer 32 and so on to the STB 30.

The printer CPU system 87 typically comprises a CPU, a program ROM, a RAM and a flash memory. The printer CPU system 87 is connected to the printer system bus arranged within the printer 32 and adapted to transmit and receive various control signals by way of the printer system bus in order to control the components of the printer 32. More specifically, the printer CPU system 87 controls the components of the printer 32 according to the command received by the printer control signal interface section 86, which may be a command for starting a printer operation. Additionally, the printer CPU system 87 receives information from each of the components of the printer 32 by way of the printer system bus processes the received information, which may be telling the completion of the current printing operation or an out-of-printing paper status. Then, the printer CPU system 87 transmits the processed information to the printer control signal interface section 86.

Note that, in FIG. 12, the arrows showing the flows of various control signals being exchanged between the printer system bus and the components of the printer 32 are partly omitted.

Now, a specific configuration of the printing output processing section 83 will be described below.

Figure 13:
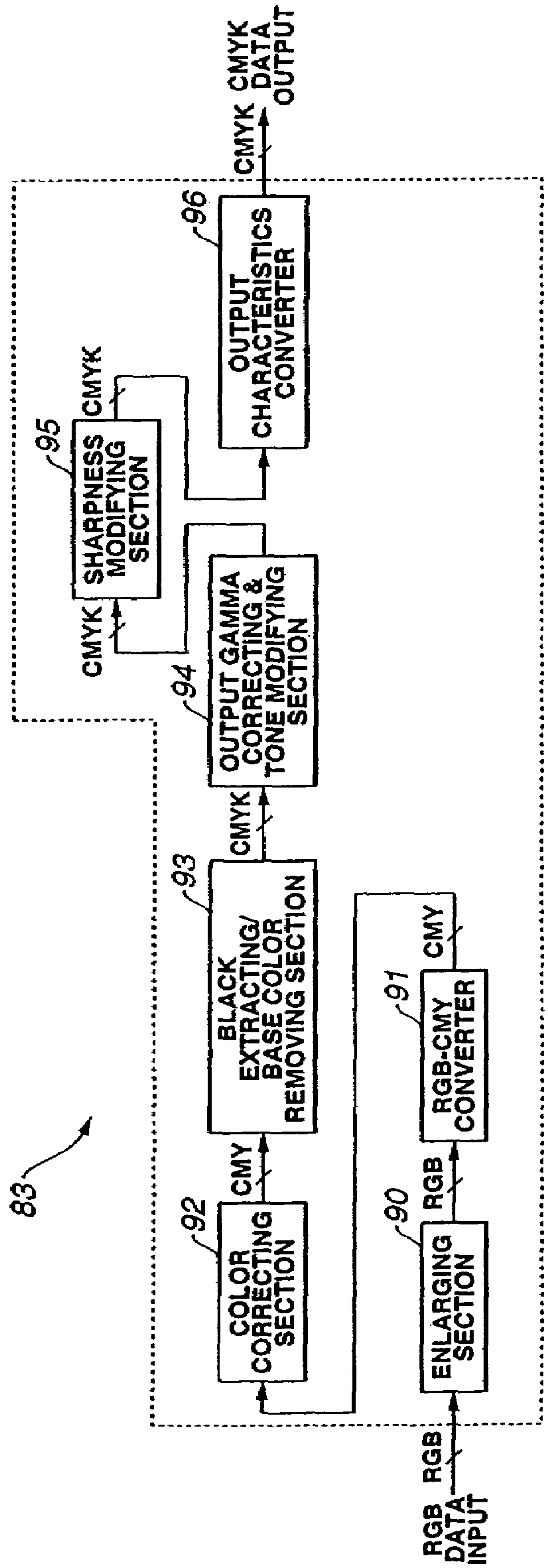
FIG. 13 is a schematic block diagram of a printing output processing section that can be used for a printer according to the invention.

Referring to FIG. 13, the printing output processing section 83 comprises an enlarging section 90, an RGB-CMY converter 91, a color correcting section 92, a black extracting/base color removing section 93, an output gamma correcting & tone modifying section 94, a sharpness modifying section 95 and an output characteristics converter 96. In FIG. 13, the arrows show the flows of various signals being exchanged among the various components of the printing output processing section 83.

The enlarging section 90 performs an enlarging operation on the input video data to obtain a number of pixels good for the current printing operation if the number of pixels of the video data in the form of RGB signals output from the printing data extracting section 82 is small when compared with the number of pixels of the image to be printed.

Figure 14A:
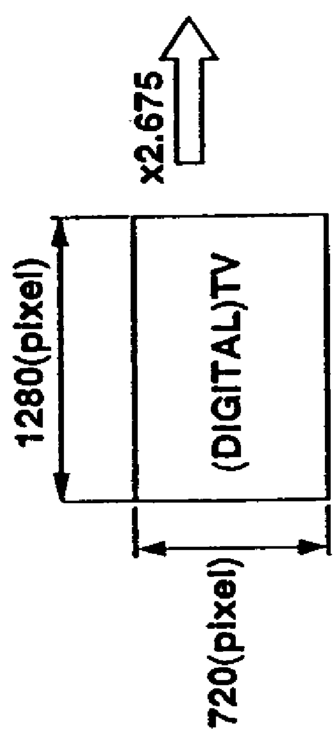
FIG. 14 is a schematic illustration of a processing operation of the enlarging section of a printer according to the invention.
Figure 14B:
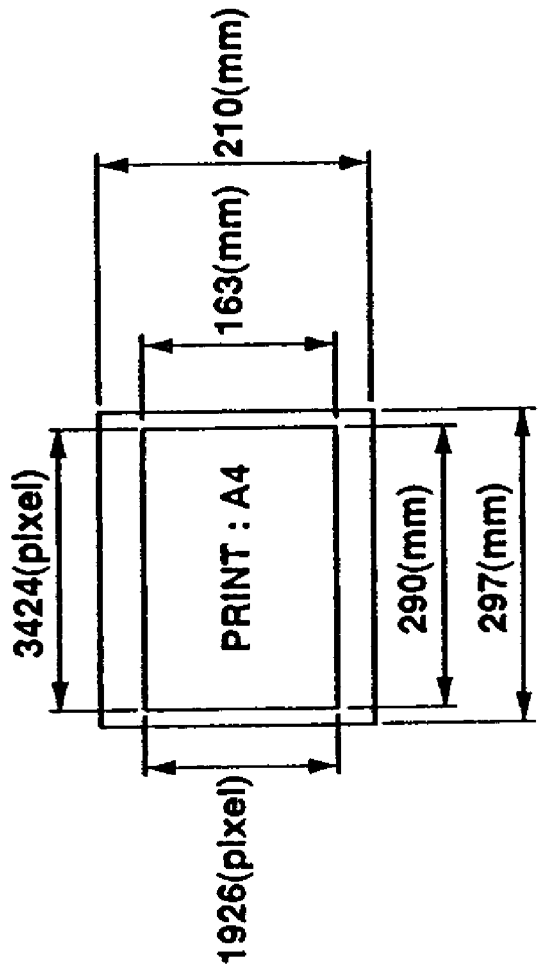

The enlarging section 90 typically receives video data of 720 p (720×1280 pixels) conforming to the standards of moving images of digital broadcasting as shown in FIG. 14 from the printing data extracting section 82. Then, if the printer 32 is adapted to print an image on a A4-size sheet of printing paper with 300 dpi, as shown in FIG. 14, the enlarging section 90 increases the number of pixels of the input video data by 2,675 times and transforms the received video data into video data for 1,926×3,424 pixels.

The RGB-CMY converter 91 processes the RGB signals of the video data subjected to the transforming operation of the enlarging section 90 to generate CMY signals that correspond to the inks or toners of C (cyan), M (magenta) and Y (yellow) that are used in the printing head 85. The transforming operation may be realized typically by using the technique of density Log transform, complementary color transform or linear masking transform.

The color correcting section 92 corrects a color correcting operation on the CMY signals generated by the RGB-CMY converter 91. With this operation, the printer 32 can corrects the discrepancy of the color tones or the hue and the color saturation of the image to be printed that can arise when the spectral absorption characteristics of the inks or the toners being used by the printing head 85 are different from the ideal characteristics obtained by the subtractive mixture of color stimuli. More specifically, the color correcting operation of the color correcting section 92 may be typically realized by means of an arithmetic converting operation using an LUT (look-up table), a linear masking technique or a non-linear masking technique. When the range of the chromatic characteristics that can be expressed by the video data input to the printer 32 differ from that of the chromatic characteristics that can be used for reproducing the image on a sheet of printing paper by the printing head 85, the color correcting section 92 performs a compressing operation and/or a clipping operation on the video data for the chromatic characteristics. Then, if the video data input to the printer 32 have a range of chromatic characteristics that exceeds the one that can be used by the printing head 85 for image reproduction, the printer can optimally carry out the printing operation by efficiently utilizing the information on the chromatic characteristics contained in the video data.

The black extracting/base color removing section 93 extracts the black element and removes the base colors from the video that have been subjected to the color correcting operation of the color correcting section 92 if the printing head 85 is provided with black (hereinafter to be referred to as K) ink or toner. More specifically, the black extracting/base color removing section 93 extracts the K element contained in the CMY signals input from the color correcting section 92 and subtracts the value corresponding to the K element from each of the C, M and Y elements to generate CMYK signals comprising C, M, Y and K elements.

The operation of extracting the K element form CMY signals and replacing them with CMYK signals may be carried out typically by using a technique of extracting all the K element contained in CMY signals, that of extracting the K element by a predetermined ratio and replacing CMY signals with CMYK signals and that of extracting the K element in regions showing the element by more than a predetermined density level and replacing CMY signals with CMYK signals.

Thus, the printer 32 can print black to an optimal quality level that can hardly be reproduced simply by using C, M and Y inks or toners as a result of the operation of the black extracting/base color removing section 93 for converting CMY signals into CMYK signals and using black ink or toner for the K element contained in the CMY signals. Note that, if the printing head 85 of the printer 32 is not provided with black ink or toner, the black extracting/base color removing section 93 does not operate for the processing operation of extracting the black elements and replacing CMY signals with CMYK signals. If such is the case, the black extracting/base color removing section 93 may alternatively be omitted from the printing output processing section 83.

The output gamma correcting & tone modifying section 94 performs an operation of correcting the gamma modifying the tones of the video data in the form of CMYK signals produced from the black extracting/base color removing section 93. More specifically, if the printing head 85 shows specific output characteristics in terms of the method of reproducing half tones, it performs an operation of correcting the gamma and modifying the tones of the input video data so as to make them adapted to the output characteristics.

The sharpness modifying section 95 performs an operation of emphasizing and smoothing the outlines of the images of the video data corrected and modified by the output gamma correcting & tone modifying section 94. As a result the quality of the images printed by the printer 32 can be improved.

The output characteristics converter 96 converts the characteristics of the video data processed by the sharpness modifying section 95 so as to optimize the quality of the image to be printed as a function of the type of the printing head 85, the method of driving the printing head 85, the type of the printing paper and the types of the inks or toners to be used for the printing operation as well as the ambient temperature at the time of the printing operation, the characteristics of the thermal history of the printing head 85 and the deviations of the performances of the printing elements provided at the printing head 85.

Note, however, of the operations of converting the various characteristics of the video data, those that are suitably be performed by the printing head driver 84 may well be performed by it.

Now, a possible configuration of the printing output processing section 82 that may be employed when the printing head 85 is operated to use only black ink or toner for printing will be discussed by referring to FIG. 15. Note that, in FIG. 15, the components that are same as or similar to their respective counterparts in FIG. 13 will be denoted respectively by the same reference symbols and will not be described any further.

Figure 15:
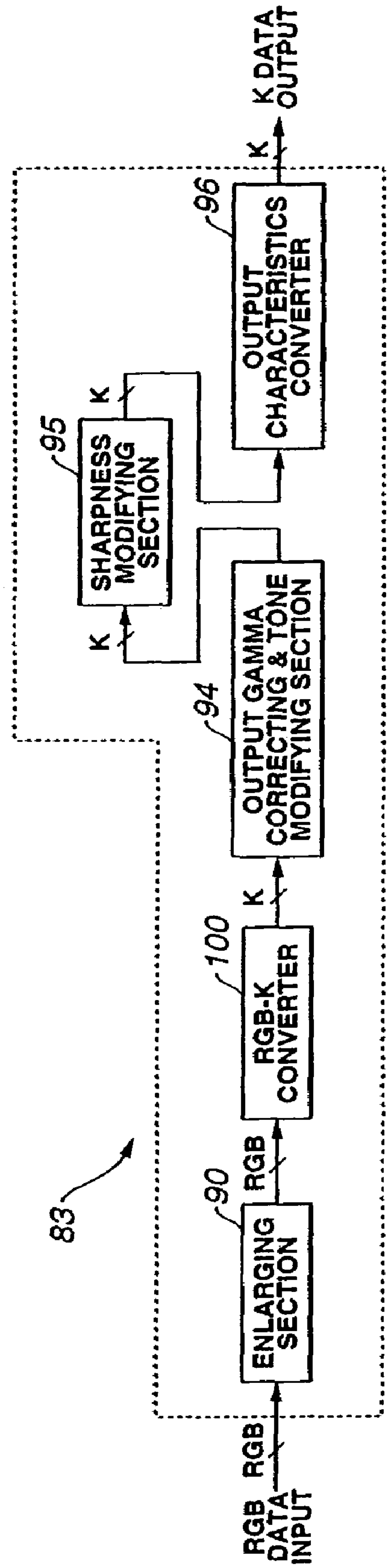
FIG. 15 is a schematic block diagram of another printing output processing section that can also be sued for a printer according to the invention.

When the printing head 85 is operated to use only black ink or toner for printing, the printing output processing section 83 is typically made to comprise an enlarging section 90, an RGB-K converter 100, an output gamma correcting & tone modifying section 94, a sharpness modifying section 95 and an output characteristics converter 96 shown in FIG. 15. Thus, in this case, the RGB-CMY converter 91, the color correcting section 92 and the black extracting/base color removing section 93 of the above described printing output processing section 83 are replaced by an RGB-K converter 100. The RGB-K converter 100 performs predetermined arithmetic operations according to the video data output as RGB signals from the enlarging section 90 to generate a K signal that contains only the density information of black (K). The RGB-K converter 100 typically generates a K signal on the basis of the brightness information Y that can be obtained by equation 1 below:

$$Y=0.2126\times R+0.7152\times G+0.0722\times B \qquad \text{(equation 1)},$$

where R, G and B respectively represent the brightness values of the R element, the G element and the B element of the RGB signals.

As shown in FIG. 15, when the printing head 85 is adapted to print images in black (K) and white, using only black ink or toner, there can be cases where the printing head 85 cannot reproduce all the grey levels contained in the video data. Then, the sharpness modifying section 95 or the output characteristics converter 96 performs a dither operation according to the number of grey levels that can be reproduced by the printing head 85. An ordered dither method or an error diffusion method may be used to express quasi-tones in the dither operation.

Now, a possible configuration of the printing head 85 will be described below by referring to an example where the printing head 85 of the printer 32 is applied to a so-called monochrome laser printer.

Figure 16:
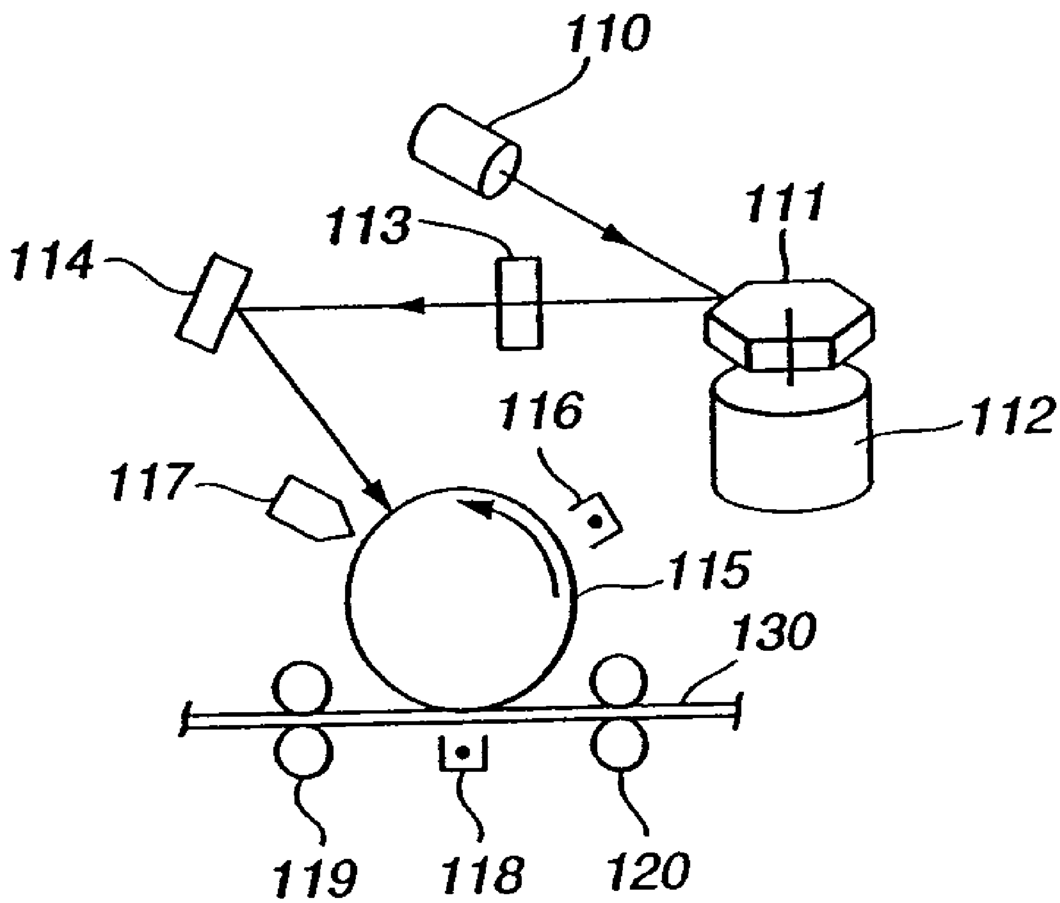
FIG. 16 is a schematic block diagram of a printing head that can be used or a printer according to the invention.

As shown in FIG. 16, the printing head 85 comprises a laser output section 110, a polygon mirror 111, a motor 112, a lens 113, a reflector mirror 114, a photosensitive drum 115, an electric charger 116, a developing unit 117, a transfer charger 118 and a pair of delivery rollers 119, 120.

When the printing head 85 is adapted to operate for a monochrome laser printer, the video data converted into K signals by the printer output processing section 83 are further converted into laser output signals by the printing head driver 84 (which may comprise a laser control section and a laser driver in certain cases), which laser output signals are then output from the laser output section 110 as laser beam in synchronism with the operation of the polygon mirror 111.

The laser beam output from the laser output section 110 is then reflected by the polygon mirror 111 that is driven to rotate by the motor 112, which is by turn driven by polygon mirror drive section (not shown), and linearly scan the main surface of the photosensitive drum 115 by way of the lens 113 and the reflector mirror 114. The photosensitive drum 115 is driven to rotate by a drum drive motor (not shown) around an axis of rotation that runs in parallel with the scanning direction of the laser beam. Additionally, the photosensitive drum 115 is electrically charged by the electric charger 116 so that a latent image corresponding to the video data is formed on the main surface of the photosensitive drum as the main surface is scanned by the laser beam.

Then, toner is supplied from the developing unit 117 to the latent image formed on the main surface of the photosensitive drum 115 to produce a toner image. As the toner image is brought to a position opposite to the transfer charger 119 by the rotary motion of the photosensitive drum 115, it is transferred onto a printing paper delivered by the pair of delivery rollers 119, 120 from a paper feed section (not shown). Subsequently, the toner on the the printing paper 130 is fixed by a fixing unit (not shown) and delivered to the outside of the printer 32.

While the printing operation of the printer 32 is described above in terms of a conventional monochrome laser printer, the present invention is by no means limited to the use of monochrome laser printers and can also be applied to color laser printers comprising a plurality of photosensitive drums, ink jet printers, thermal printers, sublimation type thermal printers and printers of many other types.

Now, typical operations of the STB 30, the display 31 and the printer 32 will be described by referring to FIGS. 17 through 19. Note that, in the following description, specifically an operation where the printer 32 prints the image displayed on the display 31 without any modification and an operation where the printer 32 prints part of the image displayed on the display 31 or an image related to the image displayed on the display 31 will be described.

In the case of the former operation, the printer 32 receives the video signals transmitted from the STB 30 by way of the digital video signal input section 80 and the monitor control signal input section 81 and generates printing data out of the received video signals. On the other hand, in the case of the latter operation, the STB 30 generates part of the image displayed on the display 31 or an image to be printed that is related to the image display on the display 31 and transmits the signals related to the image to be printed to the printer 32, using the gaps of the video signals transmitted to the display 31. Then, the printer 32 receives the signals for the image to be printed that are transmitted by using the gaps of video signals and prints the image.

Figure 17:
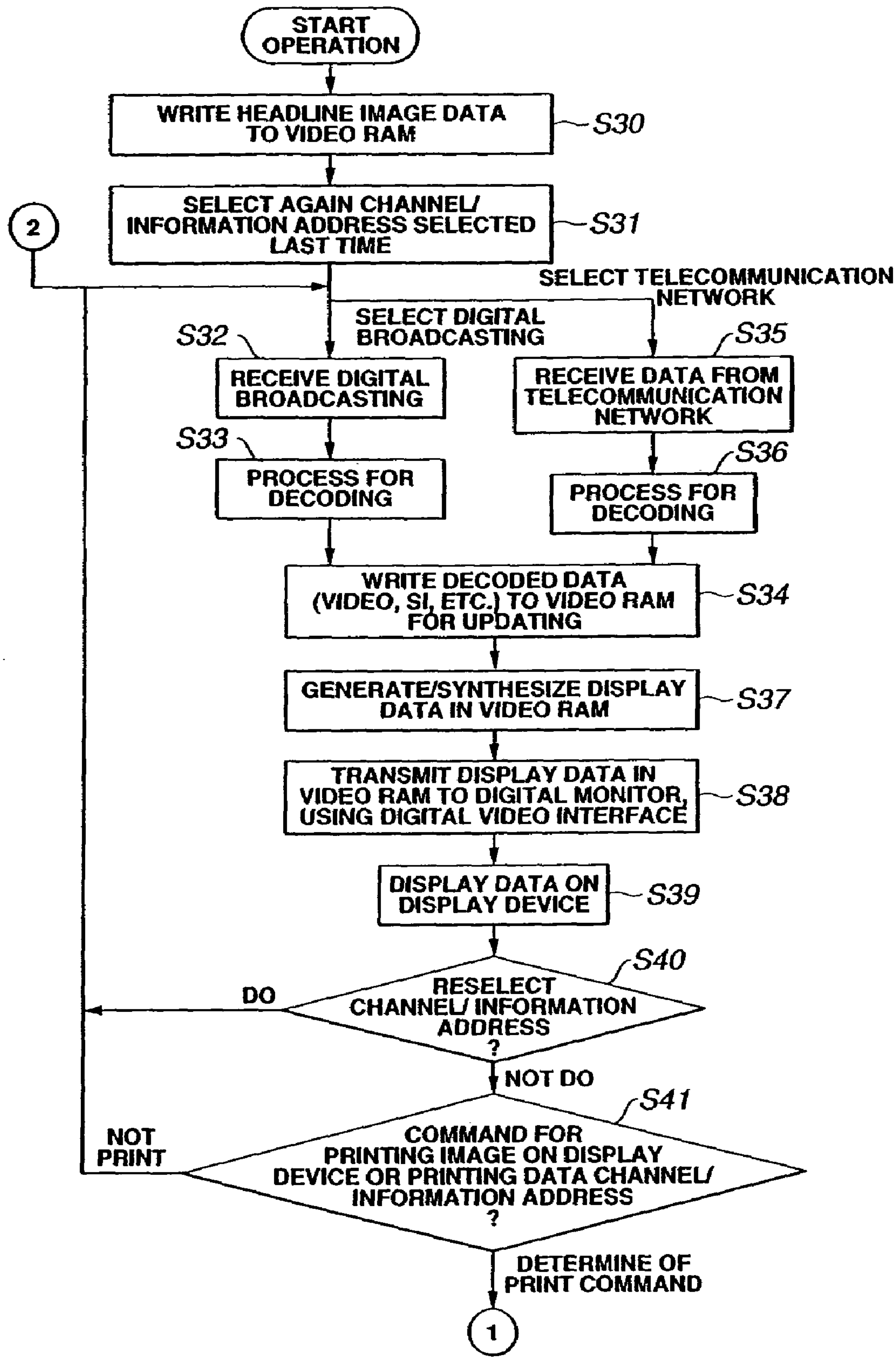
FIG. 17 is a flow chart of an operation of an STB, a display and a printer according to the invention.

After the start of the operation, the STB 30 receives various broadcasts, synthetically combines them by means of the synthesizer 59 and stores the synthesized image in the video RAM as shown in Step S30 in FIG. 17. The synthesized image may typically be an initial image as shown in FIG. 10. The STB 30 also transmits the video signals of the initial image to the display 31 and displays it on the display device 73 of the display 31.

If no command is issued by the user for a predetermined period of time, the STB 30 selects the channel or the information address selected by the user last time from the flash memory of the CPU system 65 and causes it to be displayed on the display device 73 of the display 31 as shown in Step S31.

If a program is selected in Step S31, the STB 30 receives the program by means of the down converter 50 and the tuner 51 as shown in Step S32.

Then, in Step S33, the STB 30 performs a decoding operation by means of the descrambling section 54 and the video decoder 56.

Then, in Step S34, the STB 30 synthetically by the synthesizer 59 combines the decoded video signals and the SI display signals and updates the image to be stored in the video RAM 60.

If, on the other hand, an information address is selected in Step S31, the STB 30 accesses a telecommunication network and obtains the corresponding information typically by means of the modem 64 as shown in Step S35 or receives the corresponding digital broadcasting and obtains the necessary information.

Then, in Step S36, the STB 30 decodes the obtained information typically by means of the data decoder 58 and the CPU system 65 and proceeds to the next step, or Step S34.

The image updated in Step S34 is then generated as the image to be display on the display 31 in the video RAM 60 as shown in Step S37.

Then, in Step S38, the image to be displayed that is generated in the video RAM 60 is transmitted to the display 31 by way of the digital video signal output section 61 as video signals.

Thereafter, in Step S39, the display 31 receives the transmitted video signals and displays the corresponding image on the display device 73.

Then, in Step S40, the I/O control section 63 of the STB 30 determines if the user inputs a command for selecting a broadcast program or an information address or not. If it is found that the user inputs a command for the selection, the STB 30 returns to Step S32 or S35, where it receives a new broadcast program or a new information address. If, on the other hand, it is found that no command is input by the user, the STB 30 proceeds to Step S41.

In Step S41, the I/O control section 63 determines if the user inputs a command for starting a printing operation or not. If it is found that the user inputs a command for the start of a printing operation, the STB 30 proceeds to Step S42 shown in FIG. 18. If, on the other hand, it is found that no command is input by the user, the STB 30 returns to Step S32 or S35 to continue the operation of receiving a broadcast program or an information address and updating the image to be displayed.

Figure 18:
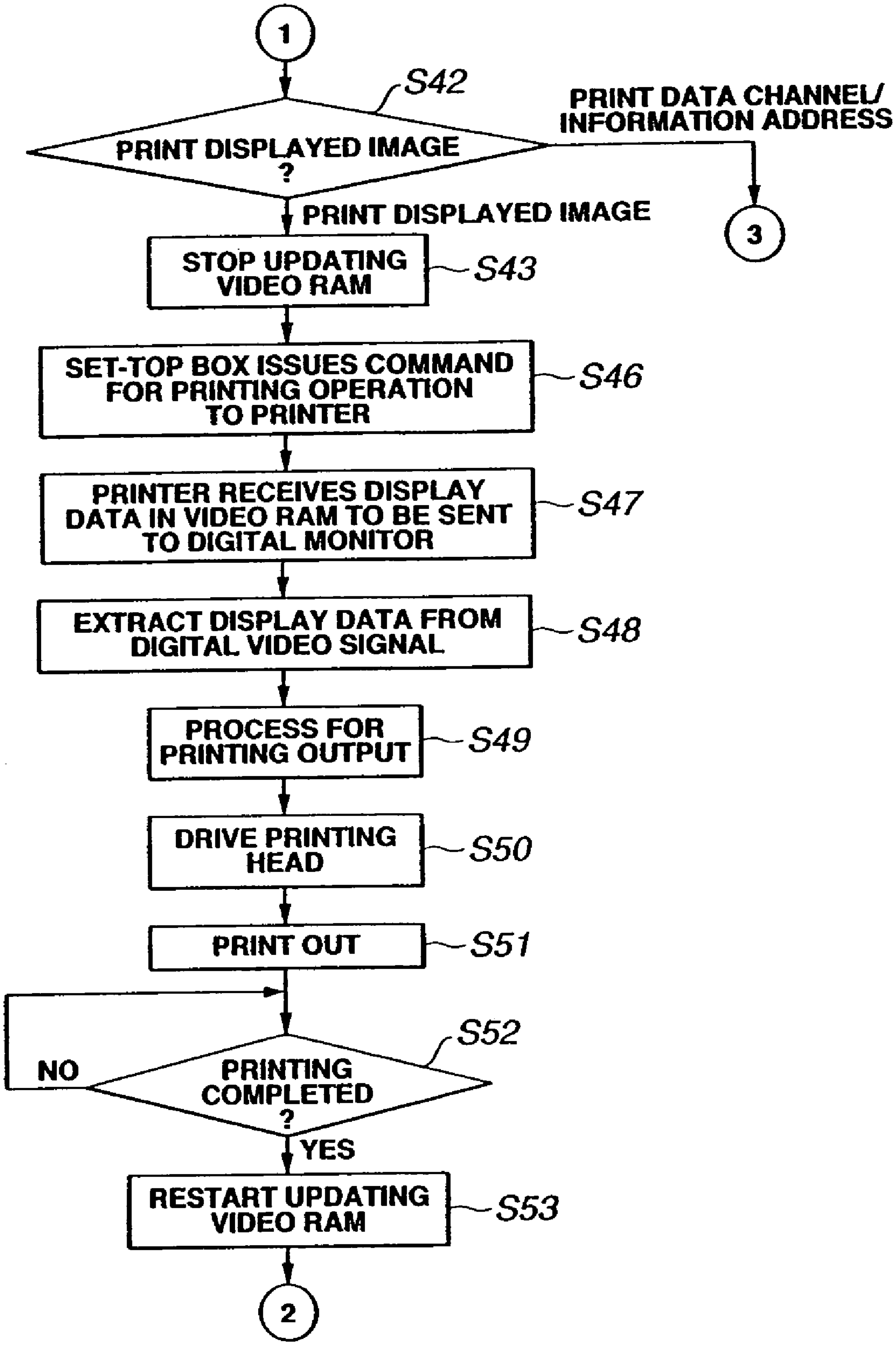
FIG. 18 is a flow chart of another operation of an STB, a display and a printer according to the invention.

Then, in Step S42 of FIG. 18, it is determined if the command for starting a printing operation input by the user is one for printing the image being displayed on the display 31 or one for printing part of the image being displayed on the display 31 or an image related to the image being displayed. The STB 30 proceeds to Step S43 in the case of the former command, whereas it proceeds to Step S44 shown in FIG. 19 in the case of the latter command.

Then, in Step S43, the STB 30 suspends the operation of updating the image stored in the video RAM 60 and holds the predetermined image for the video signals to be transmitted to the display 31 and the printer 32 so that it may proceeds to Step S46.

Then, in Step S46, the STB 30 issues a command for starting a printing operation to the printer 32 by way of the printer control signal interface 66.

Thereafter, in Step S47, the printer 32 receives the video signals transmitted from the STB 30 by way of the digital video signal input section 80 and the monitor control signal input section 81.

Subsequently, in Step S48, the printer 32 extracts the video data for the image to be printed from the received video signals by using the printing data extracting section 82.

Then, in Step S49, the printer 32 transforms the extracted image data into printing data suited for printing by using the printing output processing section 83.

Thereafter, in Step S50, the printer 32 drives the printing head 85 according to the printing data, using the printing head driver 84.

Subsequently, in Step S51, the printer 32 actually prints the image by means of the printing head 85.

Then, in Step S52, the printer 32 determines if the printing operation is completed or not by way of the printer CPU system 87. If the operation is completed, it proceeds to the nest step, or Step S53. If, on the other hand, the operation is not completed, it continues the printing operation and repeats the operation of Step S52.

Thereafter, in Step S53, the printer 32 transmits information to the STB 30 by way of the printer control interface section 86, telling that the printing operation is completed. Upon receiving the information by way of the printer control interface 66, the STB 30 returns the processing operation to Step S32 or S35 shown in FIG. 17 and restarts the operation of updating the images stored in the video RAM 60.

If the processing operation proceeds from Step S42 to Step S44, the STB 30 transmits a command for starting a printing operation to the printer 32 by way of the printer control signal interface 66 in Step S44.

Figure 19:
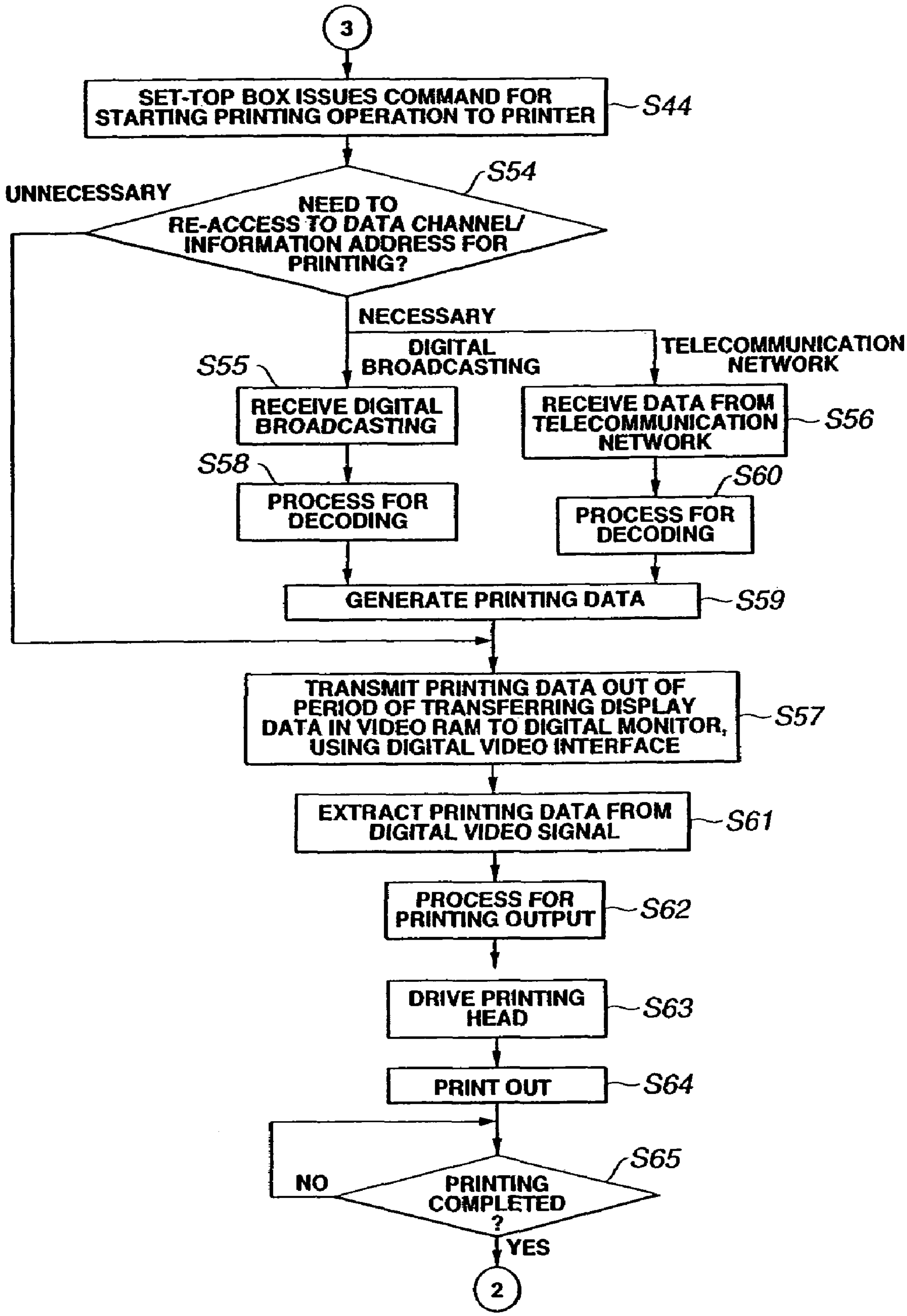
FIG. 19 is a flow chart of still another operation of an STB, a display and a printer according to the invention.

Then, in Step S54 shown in FIG. 19, the printer CPU system 87 of the printer 32 determines if it is necessary to access a new broadcast program or an information address in order to obtain an image to be printed or not. If it is found that such access is necessary, it transmits a command for it to the STB by way of the printer control signal interface section 86 and the processing operation proceeds to the next step, which may be Step S55 or S56. If, on the other hand, it is found that such access is not necessary, the processing operation proceeds to Step S57.

Then, in Step S55, the STB 30 receives the command from the printer 32 by way of the printer control signal interface 66 and obtains the program specified by the command before it proceeds to Step S58.

Thereafter, in Step S58, the STB 30 decodes the received broadcast program.

Then, in Step S59, the STB 30 generates video data to be used for printing out of the decoded broadcast program by means of the data decoder 58 or the CPU system 65 and proceeds to the nest step, or Step S57.

In Step S56, the STB 30 receives a command from the printer 32 by way of the printer control signal interface 66 along with a new information address and proceeds to Step S60.

Then, in Step S60, the STB 30 decodes the received information address and moves to Step S59.

In Step 557, the STB 30 transmits the video data for printing to the printer out of the time used for transmitting the video data to the display 31 by means of the digital video signal output section 61 and the monitor control signal output section 62. Then, it proceeds to Step S61.

In Step S61, the printer 32 receives the video signal transmitted from the STB 30 by means of the digital video signal input section 80 and the monitor control signal input section 81. Additionally, it extracts the video to be used for printing by means of the printing data extracting section 82 out of the video data it receives.

Then, in Step S62, the printer 32 transforms the video data extracted for printing into printing data adapted for printing by means of the printing output processing section 83.

Thereafter, in Step S63, the printer 32 drives the printing head 85 by means of the printing head driver 84 according to the printing data.

Subsequently, in Step S64, the printer 32 carries out the printing operation by means of the printing head 85.

Then, in Step S65, the printer 32 determines if the printing operation is completed or not by means of the printer CPU system 87. If it is found that the operation is completed, the printer 32 proceeds to Step S32 or S35 shown in FIG. 17 so that the STB 30 resumes the operation of receiving a broadcast program or an information address and updating the data stored in the video RAM 60. If, on the other hand, it is found that the operation is not completed, the printer 32 continues the printing operation and repeats the operation of Step S65.

Embodiment 2

Figure 20:
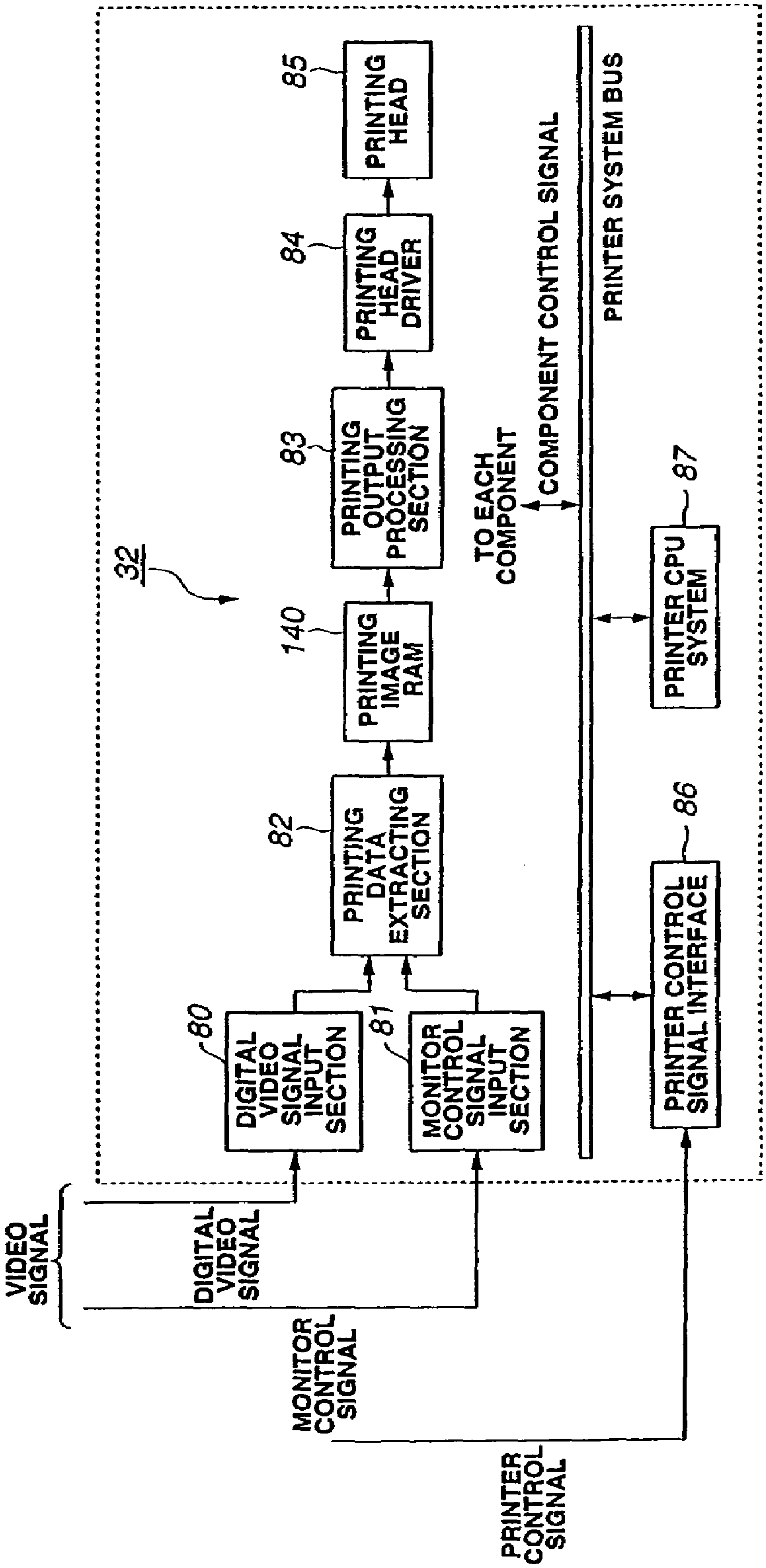
FIG. 20 is a schematic block diagram of another printer according to the invention.

Now, a second embodiment of the present invention will be described below. As shown in FIG. 20, this second embodiment differs from the above described first embodiment in that a printing image RAM 140 is added to the downstream of the printing data extracting section 82. The components that are same as those of the printer 32 shown in FIG. 10 are denoted respectively by the same reference symbols in FIG. 20 and will not be described any further.

The printing image RAM 140 operates to temporarily store at least part of the video data extracted by the printing data extracting section 82 and the printer 32 is adapted to output the video data stored in the printing image RAM 140 to the printing output processing section 83. The printer 32 normally has to spend a long period of time until the completion of a printing operation if compared with the time spent for receiving video data to be used for the printing operation from the STB 30. Because of this fact, in the above first embodiment, the operation of updating the data stored in the video RAM 60 of the STB 30 is suspended until the printing operation of the printer 32 is completed in order to continuously transmit certain video data temporarily stored in the video RAM 60 as described above by referring to Step S43 in FIG. 18. In other words, in the first embodiment, the image displayed on the display 31 is not updated and the display 31 keeps on displaying a given still image until the printing operation of the printer 32 is completed. While this may provide an advantage that the user can easily recognize that the printer 32 is operating for printing an image, the user has to forcibly and disadvantageously suspend his or her viewing of the broadcast program.

To the contrary, since the printer 32 of the second embodiment is provided with a printing image RAM 140, it can temporarily hold at least part of the video data transmitted from the STB 30 so that, if a sufficient amount of video data to be used for printing images is stored in the printing image RAM 140, the STB 30 can resume the operation of updating the data stored in the video RAM without waiting for the completion of the printing operation. As a result, the time period during which the user is forced to suspend viewing the broadcast program can be significantly reduced.

While the printing image RAM 140 is not subjected to any limitations in terms of storage capacity for the purpose of the present invention, it preferably has a storage capacity sufficient for temporarily storing all the video data to be used for a printing operation. Then, if a considerable time is required for the completion of the printing operation, the STB 30 does not need to suspend the operation of updating the data stored in the video RAM 60 and hence the user is not forced to suspend his or her viewing of the broadcast program.

Note that the printing image RAM 140 may be arranged downstream relative to the printing output processing section 83 instead of downstream relative to the printing data extracting section 82. With this arrangement, the time period during which the user is forced to suspend viewing the broadcast program can be also significantly reduced if the time required for the processing operation of the printing output processing section 83 is short enough.

Embodiment 3

Now, a third embodiment of the present invention will be described below. In this third embodiment, the printer 32 is adapted to develop part of the information contained in the digital broadcasting received by the STB 30.

Figure 21:
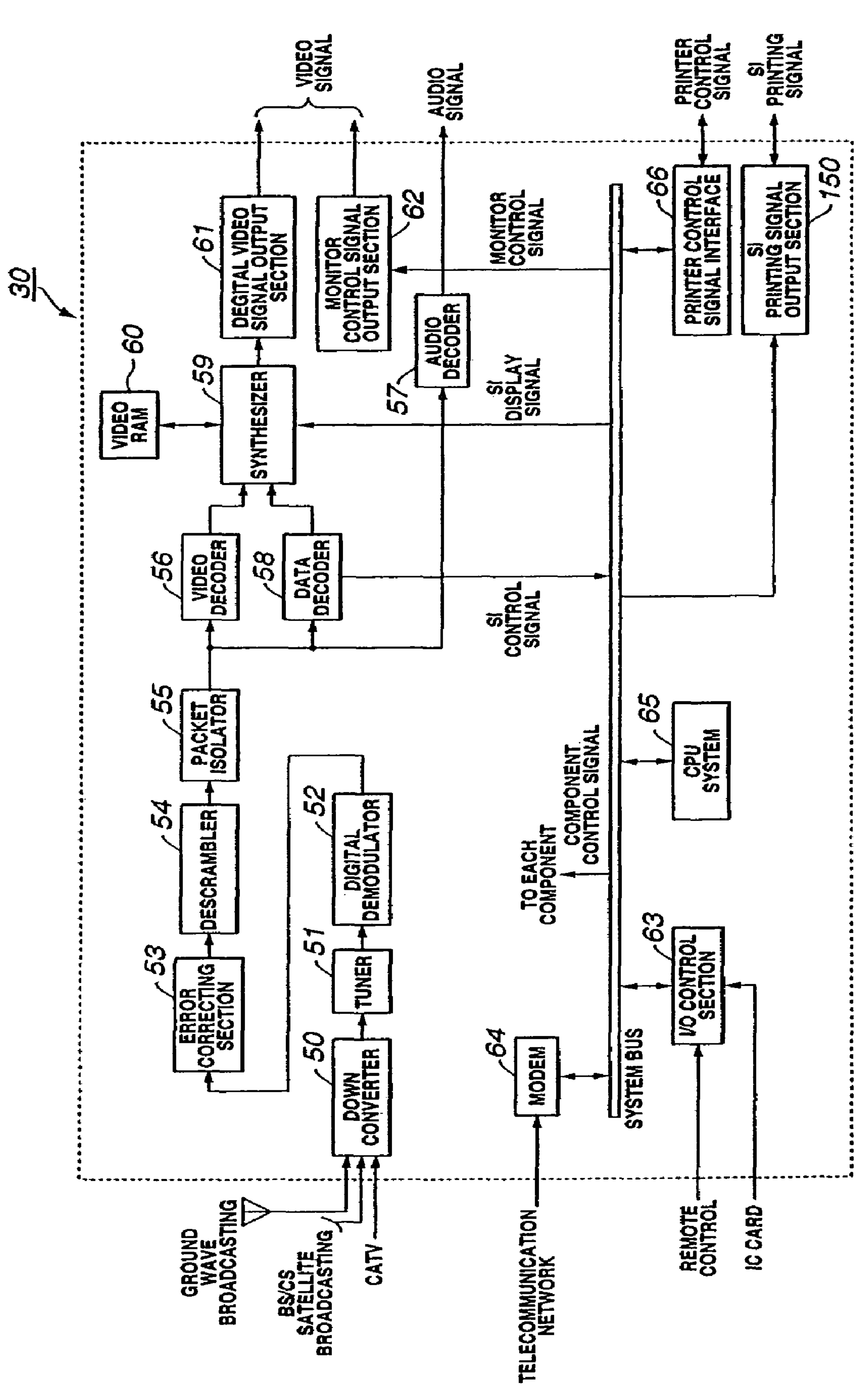
FIG. 21 is a schematic block diagram of another STB according to the invention.
Figure 22:
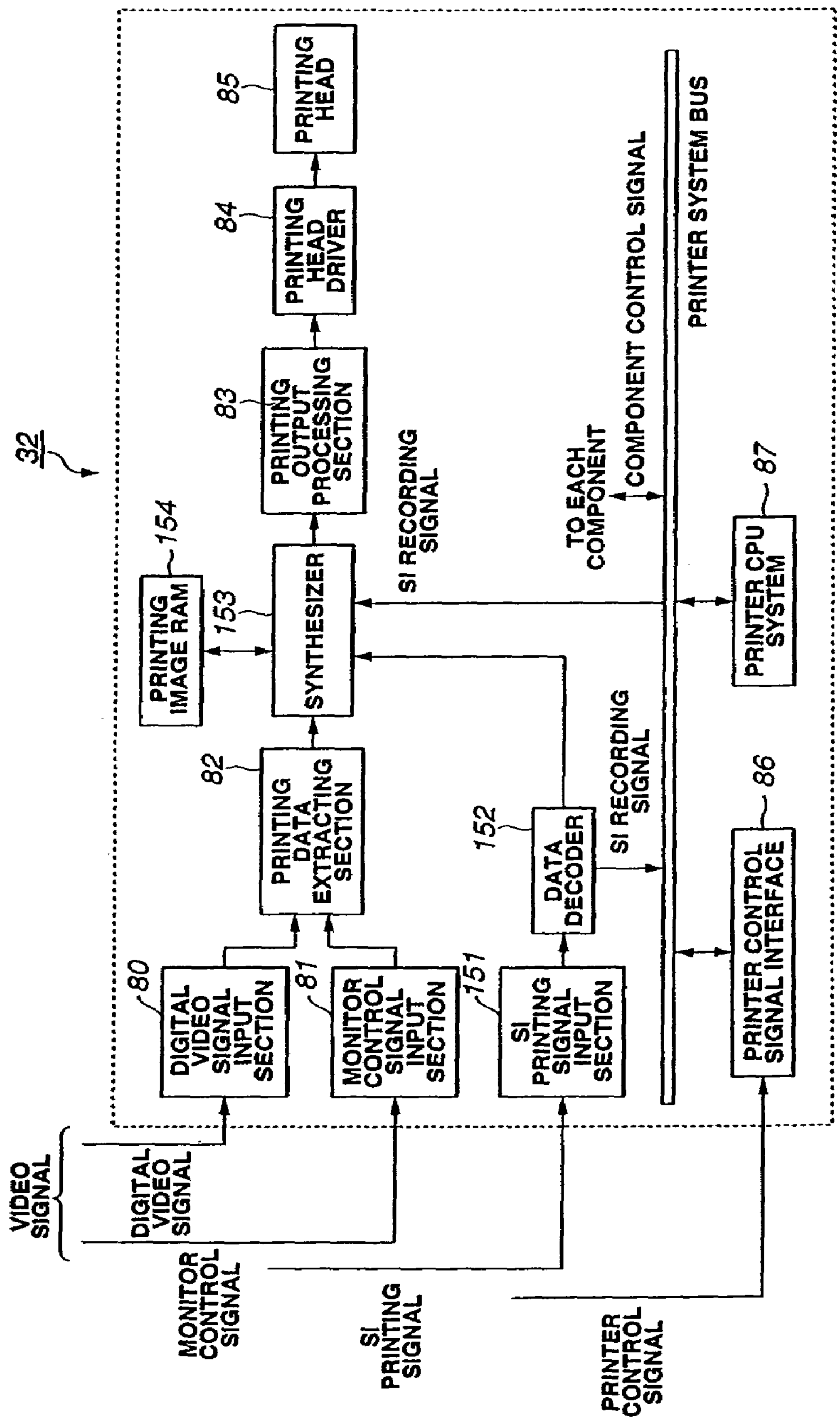
FIG. 22 is a schematic block diagram of another printer according to the invention.

In this third embodiment, the STB 30 is additionally provided with an SI printing signal output section 150 as shown in FIG. 21 while the printer 32 is additionally provided with an SI printing signal input section 151, a data decoder 152, a synthesizer 153 and a printing image RAM 154 as shown in FIG. 22. Furthermore, the printer CPU system 87 of the printer 32 is provided with a font ROM. The SI printing signal output section 150 of the STB 30 and the SI printing signal input section 151 of the printer 32 are connected to each other by means of the above described second signal transmission means or some other signal transmission means that is equivalent to the second signal transmission means.

The components that are same as those of the STB 30 and those of the printer 32 shown respectively in FIG. 8 and FIG. 10 are denoted respectively by the same reference symbols in FIG. 21 and FIG. 22 and will not be described any further.

The STB 30 of this embodiment is adapted to isolate the packet of a target program out of the input stream where video signals and audio signals are multiplexed according to the MPEG-2 Standards by means of the packet isolator 55 and also the information other than video signals and audio signals, which is referred to as SI control signal, by means of the data decoder 58. The isolated SI control signal is then output to the CPU system 65. The CPU system 65 of the STB 30 generates and/or extracts the information to be developed by the printer 32 as SI printing signal on the basis of the SI control signal output from the data decoder 58, which SI printing signal is then output it to the SI printing signal output section 150. Then, the SI printing signal output section 150 transmits the SI printing signal to the printer 32 byway of the second signal transmission means or some other signal transmission means that is equivalent to the second signal transmission means.

Note that an SI printing signal is a signal containing less information than the corresponding video data. It is typically processed by the data decoder 152 of the printer 32 in a predetermined way to generate service information and character information.

Then, the printer 32 receives the SI printing signal transmitted from the STB 30 by way of the SI printing signal input section 151. The SI printing signal received by the SI printing signal input section 151 is then input to the data decoder 152. The data decoder 152 decodes the SI printing signal and outputs the part of the decoded SI printing signal that can be directly developed into displayable data to the synthesizer 153 and the remaining part of the decoded SI printing signal that cannot be directly developed into displayable data to the CPU system 87 by way of the system bus as SI control signal.

The SI control signal output to the printer CPU system 87 is then processed by the latter and output to the synthesizer 153 as SI recording signal. More specifically, the printer CPU system 87 transforms the SI control signal into a displayable SI recording signal by way of a processing operation using the font data stored in the font ROM.

The synthesizer 153 is equivalent to the synthesizer 59 of the STB 30 and adapted to receive the video data extracted by the printing data extracting section 82, the SI printing signal output from the data decoder 152 and the SI recording signal produced as a result of the transforming operation of the printer CPU system 87 and synthetically combines them before storing them into the printing image RAM 154. The video data synthetically combined and stored into the printing image RAM 154 are then output to the printing output processing section 83.

In this embodiment, data containing a large amount of information such as video data are transmitted from the STB 30 to the printer 32 by way of the high speed first signal transmission means, while data containing a relatively small amount of information such as service information and character information are transmitted from the STB 30 to the printer 32 by way of the second signal transmission means that transmits data only at a rate lower than the first signal transmission means. Therefore, in this embodiment, it is possible to generate service information and character information by means of not the STB 30 but the printer 32 and the first signal transmission means can be dedicated to the transmission of video data. Thus, any possible delay of signal transmission that can be caused by transmitting data other than video data by means of the first signal transmission means can be avoided in this embodiment.

Embodiment 4

Now, a fourth embodiment of the present invention will be described below. This embodiment resembles the above described third embodiment in that part of the information contained in the digital broadcasting received by the STB 30 is developed and processed by the printer 32.

Figure 23:
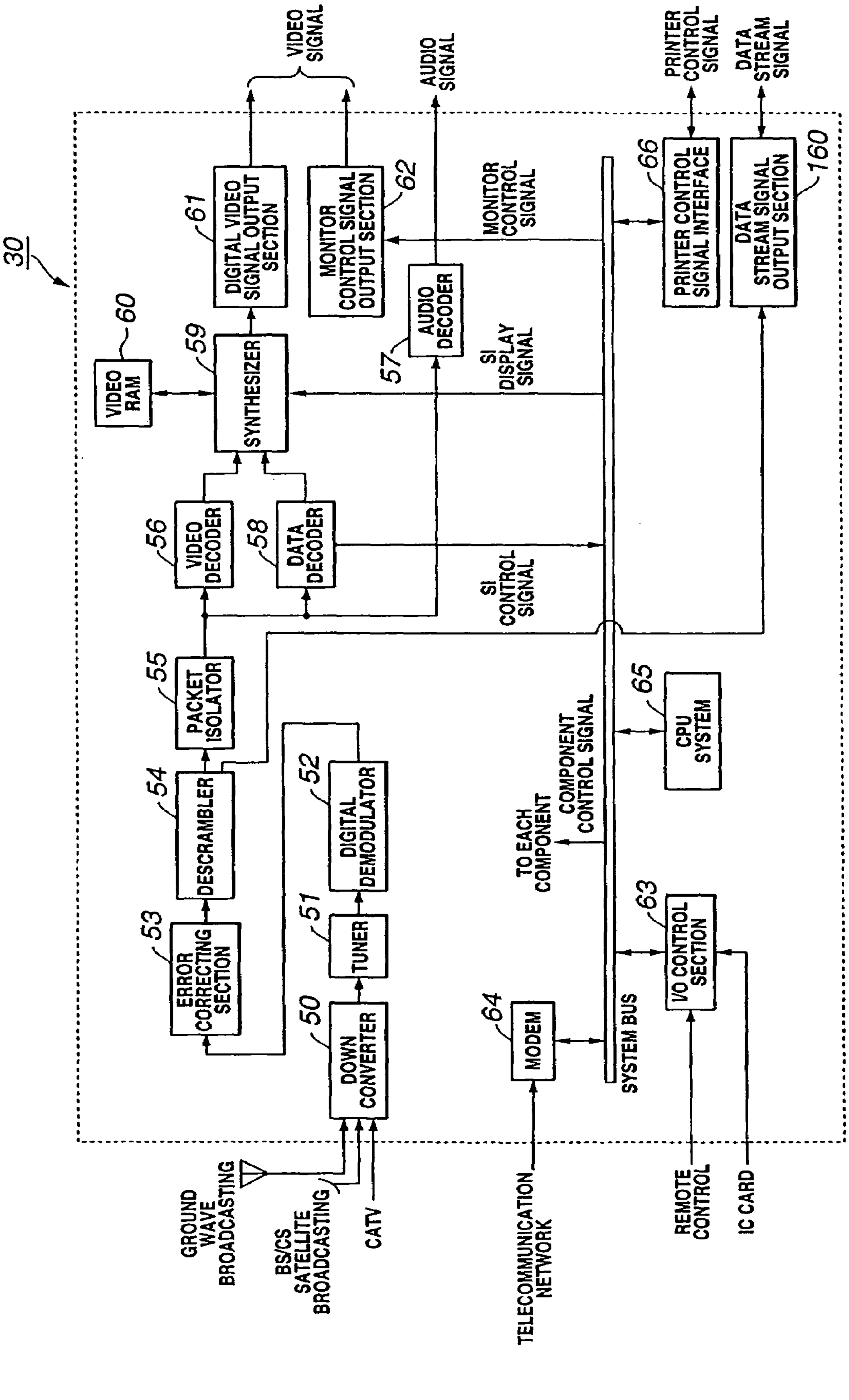
FIG. 23 is a schematic block diagram of still another STB according to the invention.
Figure 24:
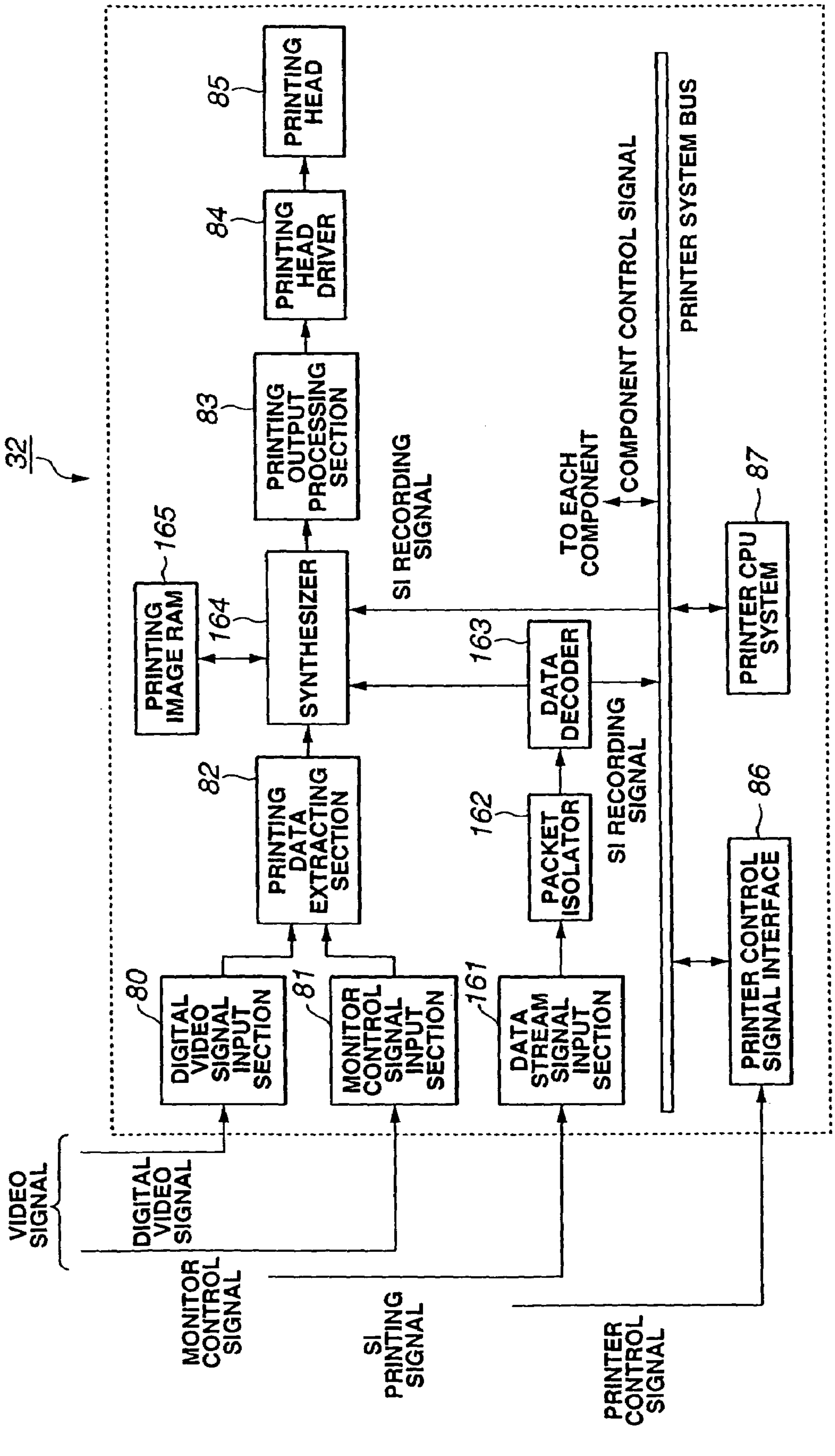
FIG. 24 is a schematic block diagram of still another printer according to the invention.

In this fourth embodiment, the STB 30 is additionally provided with a data stream signal output section 160 as shown in FIG. 23, while the printer 32 is additionally provided with a data stream signal input section 161, a packet isolator 162, a data decoder 163, a synthesizer 164 and printing image RAM 165 as shown in FIG. 24. Furthermore, the printer CPU system 87 of the printer 32 is provided with a font ROM. The data stream signal output section 160 of the STB 30 and the data stream input section 161 of the printer 32 are connected to each other by way of the second signal transmission means or some other signal transmission means that is equivalent to the second signal transmission means.

The components that are same as those of the STB 30 and those of the printer 32 shown respectively in FIG. 8 and FIG. 10 are denoted respectively by the same reference symbols in FIG. 23 and FIG. 24 and will not be described any further.

The STB 30 of this embodiment outputs the data stream signal that is descrambled by the descrambling section 54 to the packet isolator 55 and the data stream signal output section-160. The data stream signal output section 160 transmits the data stream signal it receives to the printer 32 by way of the second signal transmission means or some other signal transmission means that is equivalent to the second signal transmission means.

A data stream signal is a signal before being subjected to a packet isolating operation of the packet isolator 55 of taking out the packet of a desired program, from which service information and character information will typically be generated by the packet isolator 162 of the printer 32.

The printer 32 receives the data stream signal transmitted from the STB 30 by way of its data stream signal input section 161. The data stream signal received by the data stream signal input section 161 is then input to the packet isolator 162. The packet isolator 162 is adapted to operate substantially same as the packet isolator 55 of the STB 30 so that it takes out the packet of the desired program from the data stream signal. The packet isolator 162 then outputs the taken out packet to the data decoder 163.

The data decoder 163 decodes the data of the packet taken out by the packet isolator 162 and outputs the part of the decoded signal that can be directly developed into printable data to the synthesizer 164 as SI printing signal and the remaining part of the decoded signal that cannot be directly developed into printable data to the printer CPU system 87 by way of the system bus as SI control signal.

The SI control signal output to the printer CPU system 87 is processed by the latter and output to the synthesizer 164 as SI recording signal. More specifically, the printer CPU system 87 transforms the SI control signal into a printable SI recording signal by way of a processing operation using the font data stored in the font ROM.

The synthesizer 164 is equivalent to the synthesizer 59 of the STB 30 and adapted to receive the video data extracted by the printing data extracting section 82, the SI printing signal output from the data decoder 163 and the SI recording signal produced as a result of the transforming operation of the printer CPU system 87 and synthetically combines them before storing them into the printing image RAM 165. The video data synthetically combined and stored into the printing image RAM 165 are then output to the printing output processing section 83.

Thus, in this embodiment again, data containing a large amount of information such as video data are transmitted from the STB 30 to the printer 32 by way of the high speed first signal transmission means, while data containing a relatively small amount of information such as service information and character information are transmitted from the STB 30 to the printer 32 by way of the second signal transmission means that transmits data only at a rate lower than the first signal transmission means. Therefore, in this embodiment, it is possible to generate service information and character information by means of not the STB 30 but the printer 32 and the first signal transmission means can be dedicated to the transmission of video data. Thus, any possible delay of signal transmission that can be caused by transmitting data other than video data by means of the first signal transmission means can be avoided in this embodiment just like the above described third embodiment.

Embodiment 5

Now, a fifth embodiment of the present invention will be described below. In this embodiment, the printer 32 is provided with a feature of receiving digital broadcasting apart from the STB 30.

Figure 25:
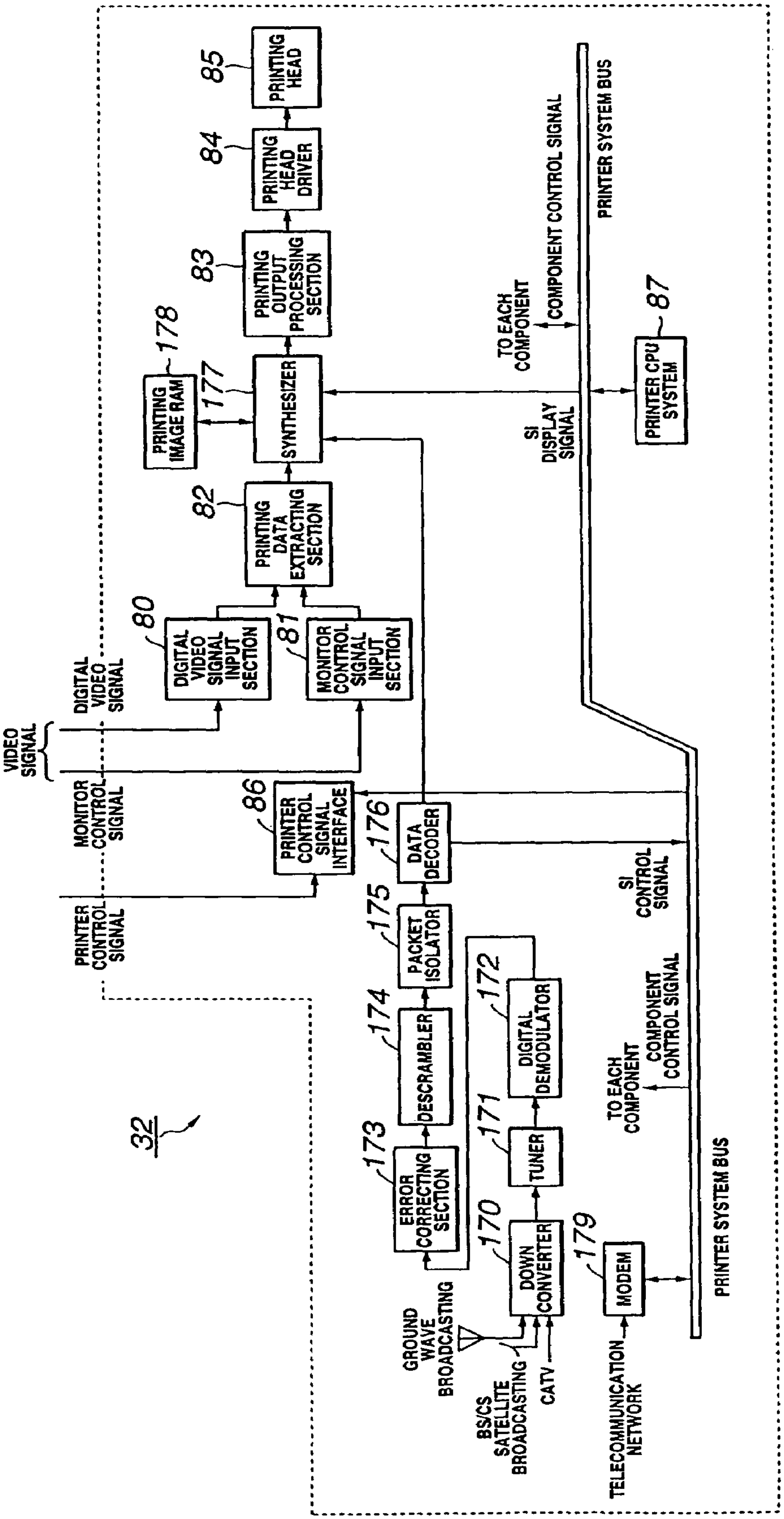
FIG. 25 is a schematic block diagram of still another printer according to the invention.

Referring to FIG. 25, illustrating the configuration of the printer 32 of the fifth embodiment, the printer 32 comprises a down converter 170, a tuner 171, a digital demodulator 172, an error correcting section 173, a descrambling section 174, a packet isolator 175, a data decoder 176, a synthesizer 177, a printing image RAM 178 and a modem 179 in addition to the components of the printer 32 of the first embodiment. Additionally, the printer CPU system 87 of the printer 32 is provided with a font ROM.

The components that are same as those of the printer 32 shown in FIG. 10 are denoted by the same reference symbols in FIG. 25 and will not be described any further.

The down converter 170, the tuner 171, the digital demodulator 172, the error correcting section 173, the descrambling section 174, the packet isolator 175 and the data decoder 176 correspond respectively to the down converter 50, the tuner 51, the digital demodulator 52, the error correcting section 53, the descrambling section 54, the packet isolator 55 and the data decoder 58 of the above described STB 30. In other words, the printer 32 of this embodiment is provided with a digital broadcasting reception means substantially same as that of the STB 30.

However, in the printer 32, the packet isolated by the packet isolator 175 is output only to the data decoder 176. Then, the data decoder 176 decodes only the SI information without decoding the video data and the audio data contained in the packet. Thereafter, the data decoder 176 outputs the part of the decoded SI signal that can be directly developed into printable data to the synthesizer 177 as SI printing signal and the remaining part of the decoded signal that cannot be directly developed into printable data to the printer CPU system 87 by way of the system bus as SI control signal.

The SI control signal output to the printer CPU system 87 is processed by the latter and output to the synthesizer 177 as SI recording signal. More specifically, the printer CPU system 87 transforms the SI control signal into a printable SI recording signal by way of a processing operation using the font data stored in the font ROM.

The synthesizer 177 is equivalent to the synthesizer 59 of the STB 30 and adapted to receive the video data extracted by the printing data extracting section 82, the SI printing signal output from the data decoder 176 and the SI recording signal produced as a result of the transforming operation of the printer CPU system 87 and synthetically combines them before storing them into the printing image RAM 178. The video data synthetically combined and stored into the printing image RAM-178 are then output to the printing output processing section 83.

As described above, the printer 32 is provided with a feature of receiving digital broadcasting apart from the STB 30. As a result, the printer 32 can obtain service information and/or character information out of a given broadcast program according to a predetermined signal contained in the printer control signal received by way of the printer control signal interface section 86 apart from the video data to be displayed on the display 31. Thus, the printer 32 now can not only print the video data to be displayed on the display 31 but also independently access a broadcast program and/or an information address so that it can perform printing operations in a very flexible way.

The modem 179 is substantially equivalent to the modem 64 of the above described STB 30 and hence can transmit and receive various information by way of a telecommunication network such as a telephone line, while it is connected to the printer system bus arranged within the printer 32.

Since the printer 32 of this embodiment is provided with a modem 179, which can access a telecommunication network independently from the modem 64 of the STB 30 so that the printer 32 can obtain service information and/or character information in a very flexible way.

While the present information is described above by referring to the first through fifth embodiments, all the embodiments comprise an STB 30, a display 31 and a printer 32 as independent units thereof for the receiving section, the display section and the printing section that are indispensable components for realizing the present invention.

Figure 1:
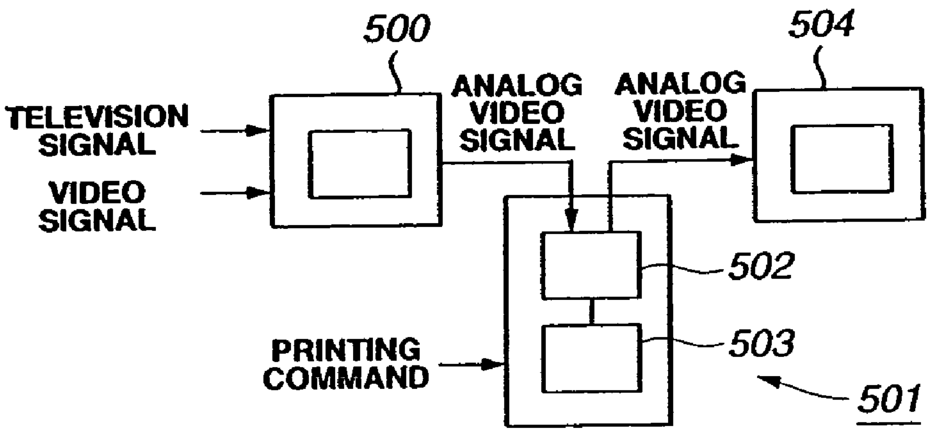
FIG. 1 is a schematic block diagram of a known analog video printer, illustrating a mode of operation thereof.
Figure 2:
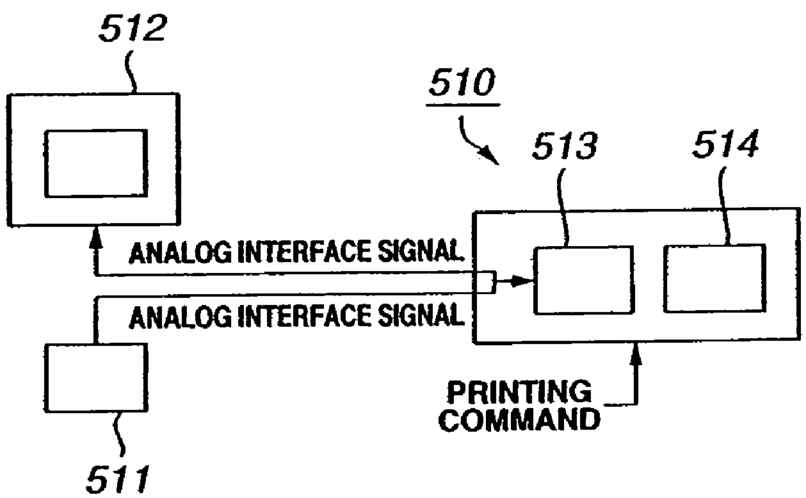
FIG. 2 is a schematic block diagram of a known multi-scan printer, illustrating a mode of operation thereof.
Figure 3:
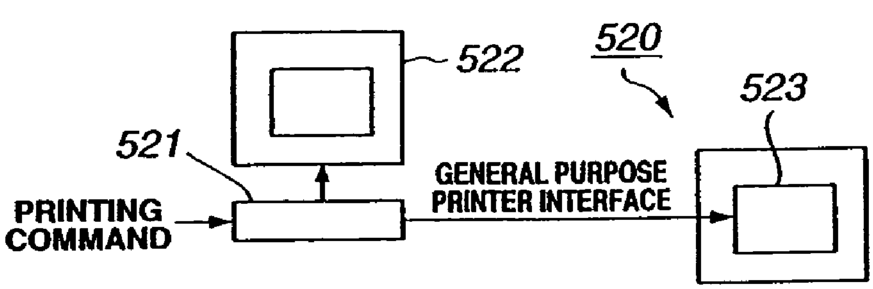
FIG. 3 is a schematic block diagram of a known PC printer, illustrating a mode of operation thereof.

However, the present invention is by no limited to the arrangement of comprising the receiving section the display section and the printing section as independent units. For example, more than two of the receiving section, the display section and the printing section may be integrally combined as in the case of FIG. 1 showing a digital television receiving set 10, FIG. 5 showing a digital television receiving set 20 and a printer 21 and FIG. 7 showing an STB 40 and a display 41. Any of such arrangements can provide the advantages as described above by referring to the first through fifth embodiments.

If more than two of the receiving section, the display section and the printing section are integrally combined, certain components of the above described embodiments may be omitted appropriately. For example, as shown in FIG. 7, if the STB 30 and the display 41 are combined integrally, the system bus of the STB 30 and the printer system bus of the printer 31 of the first embodiment may be connected to omit the printer CPU system 87 so that the components of the printing section may be controlled by the CPU system 65 of the STB 30. Then, the printer control signal interface 66 of the STB 30 and the printer control signal interface section 86 of the printer 31 may also be omitted.

What is claimed is:

1. A digital broadcasting reception system comprising a receiver for receiving digital broadcasting, a display for displaying the images of the digital broadcasting received by said receiver and a printer for printing images contained in the digital broadcasting received by said receiver;

said receiver, said display and said printer being connected to each other by way of a first signal transmission means for transmitting digital signals;

said receiver having:

a reception means for receiving digital broadcasting, an imaging means for generating video data by performing a predetermined imaging operation according to the received signals of digital broadcasting, an output means for transmitting the video data generated by said imaging means by way of said first signal transmission means to said display and to said printer, and a code data generating means for generating code data containing service information and/or character information by performing a certain processing operation according to the signals of the digital broadcasting received by said reception means;

said printer having:

a reception means for receiving video data transmitted by said first signal transmission means, a printing means for printing the images of the video data received by said reception means, a code data extracting means for extracting the service information and/or the character information out of the code data received by said transmission/reception means, and a synthesizing means for synthesizing the service information and/or the character information extracted by said code data extracting means and generating synthesized images;

said receiver and said printer are connected to each other by way of a second signal transmission means showing a data transmission rate lower than said first signal transmission means;

said receiver and said printer being provided with respective transmission/reception means for transmitting and receiving code data containing a quantity of information smaller than said video data;

said printing means being adapted to print the synthesized images generated by said synthesizing means; and said second signal transmission means is used for the exchange of printer control signals.

2. A printer for printing the images of the video data generated by a receiver out of the digital broadcasting received by it, said printer comprising:

a reception means for receiving the video data transmitted from said receiver to a display by way of a first signal transmission means for transmitting signals for displaying digital broadcasting and to the printer by way of said first signal transmission means; and a printing means for printing the images of the video data received by said reception means;

a transmission/reception means for transmitting and receiving code data containing a quantity of information smaller than said video data;

a code data extracting means for extracting the service information and/or the character information out of the code data received by said transmission/reception means; and a synthesizing means for synthesizing the service information and/or the character information extracted by said code data extracting means and generating synthesized images;

said printer is connected to said receiver by way of a second signal transmission means showing a data transmission rate lower than said first signal transmission means;

said reception means receives the code data containing service information and/or character information and generated by said receiver by performing a certain processing operation according to the signals of the received digital broadcasting;

said printing means being adapted to print the synthesized images generated by said synthesizing means;

said second signal transmission means is used for the exchange of printer control signals.

3. A printing method for receiving digital broadcasting by means of a receiver and printing images contained in the digital broadcasting received by said receiver, said method comprising:

connecting said receiver, a display for displaying the images of the digital broadcasting received by said receiver and said printer to each other by means of a first signal transmission means for transmitting digital signals;

said receiver operating for:

receiving digital broadcasting;

generating video data by performing a predetermined imaging operation according to the received signals of digital broadcasting; and transmitting the video data generated by said imaging means by way of said first signal transmission means;

said printer operating for:

receiving the video data transmitted by said first signal transmission means; and printing the images of the video data received by said reception means;

said receiver and said printer are connected to each other by way of a second signal transmission means showing a data transmission rate lower than said first signal transmission means;

said receiver and said printer being provided with respective transmission/reception means for transmitting and receiving code data containing a quantity of information smaller than said video data;

said receiver generates code data containing service information and/or character information by performing a certain processing operation according to the signals of the digital broadcasting received by it;

said printer extracts the service information and/or the character information out of the code data received by it, synthesizes the service information and/or the character information extracted by it and generates synthesized images;

said printer being adapted to print the synthesized images; and said second signal transmission means is used for the exchange of printer control signals.

* * * * *